(12) United States Patent
Zhang et al.

(10) Patent No.: US 12,495,391 B2
(45) Date of Patent: Dec. 9, 2025

(54) SERVICE PRIORITY INFORMATION FOR MULTI-SIM USER EQUIPMENT PAGING

(71) Applicant: QUALCOMM Incorporated, San Diego, CA (US)

(72) Inventors: Juan Zhang, Beijing (CN); Gavin Bernard Horn, La Jolla, CA (US); Ozcan Ozturk, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 467 days.

(21) Appl. No.: 17/615,768

(22) PCT Filed: Apr. 15, 2020

(86) PCT No.: PCT/CN2020/084956
§ 371 (c)(1),
(2) Date: Dec. 1, 2021

(87) PCT Pub. No.: WO2020/244312
PCT Pub. Date: Dec. 10, 2020

(65) Prior Publication Data
US 2022/0312368 A1    Sep. 29, 2022

(30) Foreign Application Priority Data
Jun. 6, 2019    (WO) ................ PCT/CN2019/090297

(51) Int. Cl.
*H04W 68/00* (2009.01)
*H04W 8/18* (2009.01)
*H04W 12/06* (2021.01)

(52) U.S. Cl.
CPC ......... *H04W 68/005* (2013.01); *H04W 8/183* (2013.01); *H04W 12/068* (2021.01)

(58) Field of Classification Search
CPC ... H04W 8/183; H04W 12/068; H04W 48/18; H04W 68/005; H04W 68/02; H04W 68/12; H04W 88/06
See application file for complete search history.

(56) References Cited

U.S. PATENT DOCUMENTS

| 10,117,219 B2 | 10/2018 | Horn et al. |
| 10,187,781 B2 | 1/2019 | Kumar et al. |

(Continued)

FOREIGN PATENT DOCUMENTS

| CN | 102026374 A | 4/2011 |
| CN | 102640552 A | 8/2012 |

(Continued)

OTHER PUBLICATIONS

"Procedures for the 5G System (5GS)", 3GPP TS 23.502 version 15.5.1 Release 15, (May 2019) (Year: 2019).*

(Continued)

*Primary Examiner* — Ayaz R Sheikh
*Assistant Examiner* — David Zhijun Sun
(74) *Attorney, Agent, or Firm* — Patterson & Sheridan, LLP

(57) ABSTRACT

Certain aspects of the present disclosure provide techniques for service priority information for multi-SIM user equipment (UE) paging. An exemplary method generally includes communicating with a first network using a first set of credentials, wherein the UE includes a second set of credentials associated with a second network; receiving a paging message for an information transmission in the second network, wherein the paging message includes service priority information corresponding to the information transmission; determining, from the service priority information, a service priority value corresponding to the information transmission based, at least in part, on policy con- (Continued)

figuration information; determining whether to establish a connection in the second network in response to the paging message based, at least in part, on the service priority value; and taking one or more actions based, at least in part, on the determination.

21 Claims, 15 Drawing Sheets

(56) References Cited

U.S. PATENT DOCUMENTS

| | | | |
|---|---|---|---|
| 2011/0217969 | A1 | 9/2011 | Spartz et al. |
| 2012/0182912 | A1* | 7/2012 | Watfa .................... H04W 68/12 |
| | | | 370/328 |
| 2012/0231802 | A1 | 9/2012 | Ngai |
| 2016/0212653 | A1* | 7/2016 | Wang .................... B01L 3/5023 |
| 2016/0261754 | A1 | 9/2016 | Keller et al. |
| 2017/0359800 | A1 | 12/2017 | Cui et al. |
| 2018/0368099 | A1 | 12/2018 | Chen et al. |
| 2019/0098487 | A1* | 3/2019 | Boettger ............... H04W 8/183 |
| 2022/0086926 | A1* | 3/2022 | Xu ...................... H04W 60/005 |

FOREIGN PATENT DOCUMENTS

| | | |
|---|---|---|
| CN | 102948233 A | 2/2013 |
| CN | 105554884 A | 5/2016 |
| EP | 3477993 A1 | 5/2019 |
| IN | 202127057541 A1 | 4/2022 |
| JP | 2016529845 A | 9/2016 |
| JP | 2017510209 A | 4/2017 |
| TW | 201836401 A | 10/2018 |
| WO | 2011109750 A1 | 9/2011 |
| WO | 2016028558 A1 | 2/2016 |
| WO | 2017052906 A1 | 3/2017 |
| WO | 2017124327 A1 | 7/2017 |
| WO | 2018062949 A1 | 4/2018 |
| WO | 2019068644 A1 | 4/2019 |
| WO | 2020209641 A1 | 10/2020 |

OTHER PUBLICATIONS

China Telecom: "Use Case: Handling of Service Prioritization", 3GPP TSG-SA WG1 Meeting #86, S1-191502 (Revision of S1-191147)—PCR-Handling of Service Prioritization, 3rd Generation Partnership Project (3GPP), Mobile Competence Centre, 650, Route Des Lucioles, F-06921 Sophia-Antipolis Cedex, France, vol. SA WG1, No. Suzhou, China, May 6, 2019-may 10, 2019, 2 Pages, May 13, 2019 (May 13, 2019), XP051743671, the whole document.
Intel Corporation: "Motivation for Ran Level Multi-Sim Support", 3GPP TSG RAN #84, RP-191347_RAN_MULTI-SIM_INTEL, 3rd Generation Partnership Project (3GPP), Mobile Competence Centre, 650, Route Des Lucioles, F-06921 Sophia-Antipolis Cedex, France, vol. TSG RAN, No. Newport Beach, USA, Jun. 3, 2019-Jun. 6, 2019, 7 Pages, Jun. 2, 2019 (Jun. 2, 2019), XP051747954, the whole document.
Intel: "General Service Requirements for Enabling Multi-USIM Devices Support", 3GPP TSG-SA WG1 Meeting #85, S1-190116-CR-0267-22278-MUSIM-V1, 3rd Generation Partnership Project (3GPP), Mobile Competence Centre, 650, Route Des Lucioles, F-06921 Sophia-Antipolis Cedex, France, vol. SA WG1, No. Tallin, Estonia, Feb. 18, 2019-Feb. 22, 2019, 4 Pages, Feb. 8, 2019 (Feb. 8, 2019), XP051609397, the whole document.
LG Electronics: "Support for Paging Reception for UE with Multiple SIMs", 3GPP TSG-SA Wg meeting #86, S1-191073 Support for Paging for Multile Usim, 3rd Generation Partnership Project (3GPP), Mobile Competence Centre, 650, Route Des Lucioles, F-06921 Sophia-Antipolis Cedex, France, vol. TSG SA, No. Suzhou, China, May 6, 2019-May 10, 2019, Apr. 29, 2019 (Apr. 29, 2019), pp. 1-3, XP051719019, the whole document.
Qualcomm Incorporated: "Establishment Cause for Voice and Video", 3GPP TSG-RAN2#103, R2-1811044 (Revision of R2-1810326)_VOICE_VIDEO_ESTCAUSE, 3rd Generation Partnership Project (3GPP), Mobile Competence Centre, 650, Route Des Lucioles, F-06921 Sophia-Antipolis Cedex, France, vol. RAN WG2, No. Gothenburg, Sweden, Aug. 20, 2018-Aug. 24, 2018, 3 Pages, Aug. 10, 2018 (Aug. 10, 2018), XP051520746, abstract, sections 1 and 3.
Supplementary Partial European Search Report—EP20819529—Search Authority—Munich—May 15, 2023.
Taiwan Search Report—TW109112729—TIPO—May 18, 2023.
International Search Report and Written Opinion—PCT/CN2020/084956—ISA/EPO—Jul. 15, 2020.
International Search Report and Written Opinion—PCT/CN2019/090297—ISA/EPO—Mar. 6, 2020.
Qualcomm Incorporated: "Access Control for Voice and Video", 3GPP TSG-RAN WG2 Meeting #101bis, R2-1805092, Sanya, China, Apr. 16-20, 2018, Apr. 20, 2018 (Apr. 20, 2018), 3 pages, the whole document.
Tencent: "Multi-SIM Service Prioritization for Data Services including Video", 3GPP TSG-SA WG1 Meeting #86, S1-191138, 2 Pages, May 10, 2019 (May 10, 2019), the whole document.
Supplementary European Search Report—EP20819529—Search Authority—Munich—Aug. 16, 2023.

* cited by examiner

SERVICE PRIORITY INFORMATION FOR MULTI-SIM USER EQUIPMENT PAGING

CROSS-REFERENCE TO RELATED APPLICATIONS

This application is a national stage application under 35 U.S.C. 371 of PCT/CN2020/084956, filed Apr. 15, 2020, which claims benefit of and priority to PCT Application No. PCT/CN2019/090297, filed Jun. 6, 2019, which is are both assigned to the assignee hereof and hereby expressly incorporated by reference herein in their entireties as if fully set forth below and for all applicable purposes.

FIELD OF THE DISCLOSURE

Aspects of the present disclosure relate to wireless communications, and more particularly, to techniques for service priority information for multi-SIM user equipment (UE) paging.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include a traffic burst factor aware wireless network that may perform improved admission control and/or resource allocation.

Certain aspects provide a method for wireless communication by a user equipment (UE). The method generally includes communicating with a first network using a first set of credentials, wherein the UE includes a second set of credentials associated with a second network; receiving a paging message for an information transmission in the second network, wherein the paging message includes service priority information corresponding to the information transmission; determining, from the service priority information, a service priority value corresponding to the information transmission based, at least in part, on policy configuration information; determining whether to establish a connection in the second network in response to the paging message based, at least in part, on the service priority value; and taking one or more actions based, at least in part, on the determination.

Certain aspects provide an apparatus for wireless communication by a user equipment (UE). The apparatus generally includes at least one processor configured to communicate with a first network using a first set of credentials, wherein the UE includes a second set of credentials associated with a second network; receive a paging message for an information transmission in the second network, wherein the paging message includes service priority information corresponding to the information transmission; determine, from the service priority information, a service priority value corresponding to the information transmission based, at least in part, on policy configuration information; determine whether to establish a connection in the second network in response to the paging message based, at least in part, on the service priority value; and take one or more actions based, at least in part, on the determination. The apparatus also generally includes a memory coupled with the at least one processor.

Certain aspects provide an apparatus for wireless communication by a user equipment (UE). The apparatus generally includes means for communicating with a first network using a first set of credentials, wherein the UE includes a second set of credentials associated with a second network; means for receiving a paging message for an information transmission in the second network, wherein the paging message includes service priority information corresponding to the information transmission; means for determining, from the service priority information, a service priority value corresponding to the information transmission based, at least in part, on policy configuration information; means for determining whether to establish a connection in the second network in response to the paging message based, at least in part, on the service priority value; and means for taking one or more actions based, at least in part, on the determination.

Certain aspects provide a non-transitory computer-readable medium for wireless communication by a user equipment (UE). The non-transitory computer-readable medium generally includes instructions that, when executed by at least one processor, cause the at least one processor to communicate with a first network using a first set of credentials, wherein the UE includes a second set of credentials associated with a second network; receive a paging message for an information transmission in the second network, wherein the paging message includes service priority information corresponding to the information transmission; determine, from the service priority information, a service priority value corresponding to the information transmission based, at least in part, on policy configuration information; determine whether to establish a connection in the second network in response to the paging message based, at least in part, on the service priority value; and take one or more actions based, at least in part, on the determination.

Certain aspects provide a method for wireless communication by a network entity. The method generally includes communicating with a user equipment (UE); determining that information needs to be transmitted to the UE; and transmitting a paging message to the UE indicating that the information needs to be transmitted to the UE, wherein the paging message includes service priority information corresponding to the information that needs to be transmitted to the UE.

Certain aspects provide an apparatus for wireless communication by a network entity. The apparatus generally includes at least one processor configured to communicate with a user equipment (UE); determine that information needs to be transmitted to the UE; and transmit a paging message to the UE indicating that the information needs to be transmitted to the UE, wherein the paging message includes service priority information corresponding to the information that needs to be transmitted to the UE. The apparatus also generally includes a memory coupled with the at least one processor.

Certain aspects provide an apparatus for wireless communication by a network entity. The apparatus generally includes means for communicating with a user equipment (UE); means for determining that information needs to be transmitted to the UE; and means for transmitting a paging message to the UE indicating that the information needs to be transmitted to the UE, wherein the paging message includes service priority information corresponding to the information that needs to be transmitted to the UE.

Certain aspects provide a non-transitory computer-readable medium for wireless communication by a network entity. The non-transitory computer-readable medium generally includes instructions that, when executed by at least one processor, cause the at least one processor to communicate with a user equipment (UE); determine that information needs to be transmitted to the UE; and transmit a paging message to the UE indicating that the information needs to be transmitted to the UE, wherein the paging message includes service priority information corresponding to the information that needs to be transmitted to the UE.

Certain aspects provide a method for wireless communication by a network entity. The method generally includes communicating with a user equipment (UE) in a first network using a first set of UE credentials; determining information needs to be transmitted to the UE via a second network using a second set of UE credentials; and transmitting, via the second network, a paging message indicating the information needs to be transmitted to the UE via the second network, wherein the paging message includes service priority information corresponding to the information that needs to be transmitted to the UE.

Certain aspects provide an apparatus for wireless communication by a network entity. The apparatus generally includes at least one processor configured to communicate with a user equipment (UE) in a first network using a first set of UE credentials; determine information needs to be transmitted to the UE via a second network using a second set of UE credentials; and transmit, via the second network, a paging message indicating the information needs to be transmitted to the UE via the second network, wherein the paging message includes service priority information corresponding to the information that needs to be transmitted to the UE. The apparatus also generally includes a memory coupled with the at least one processor.

Certain aspects provide an apparatus for wireless communication by a network entity. The apparatus generally includes means for communicating with a user equipment (UE) in a first network using a first set of UE credentials; means for determining information needs to be transmitted to the UE via a second network using a second set of UE credentials; and means for transmitting, via the second network, a paging message indicating the information needs to be transmitted to the UE via the second network, wherein the paging message includes service priority information corresponding to the information that needs to be transmitted to the UE.

Certain aspects provide a non-transitory computer-readable medium for wireless communication by a network entity. The non-transitory computer-readable medium generally includes instructions that, when executed by at least one processor, cause the at least one processor to communicate with a user equipment (UE) in a first network using a first set of UE credentials; determine information needs to be transmitted to the UE via a second network using a second set of UE credentials; and transmit, via the second network, a paging message indicating the information needs to be transmitted to the UE via the second network, wherein the paging message includes service priority information corresponding to the information that needs to be transmitted to the UE.

Certain aspects provide a method for wireless communication by a network entity. The method generally includes receiving a physical data unit (PDU) session establishment request for a user equipment (UE); receiving, from a second network entity, policy configuration information for the PDU session, wherein the policy configuration information includes service priority information associated with the PDU session; determining that information needs to be transmitted to the UE; determining, based on the policy configuration information, service priority information corresponding to the information that needs to be transmitted to the UE; and transmitting signaling to a third network entity for paging the UE about the information that needs to be transmitted to the UE, wherein the signaling includes an indication of the service priority information corresponding to the information that needs to be transmitted to the UE.

Certain aspects provide an apparatus for wireless communication by a network entity. The apparatus generally includes at least one processor configured to receive a physical data unit (PDU) session establishment request for a user equipment (UE); receive, from a second network entity, policy configuration information for the PDU session, wherein the policy configuration information includes service priority information associated with the PDU session; determine that information needs to be transmitted to the UE; determine, based on the policy configuration information, service priority information corresponding to the information that needs to be transmitted to the UE; and transmit signaling to a third network entity for paging the UE about the information that needs to be transmitted to the UE, wherein the signaling includes an indication of the service priority information corresponding to the information that needs to be transmitted to the UE. The apparatus also generally includes a memory coupled with the at least one processor.

Certain aspects provide an apparatus for wireless communication by a network entity. The apparatus generally includes means for receiving a physical data unit (PDU) session establishment request for a user equipment (UE); means for receiving, from a second network entity, policy configuration information for the PDU session, wherein the policy configuration information includes service priority information associated with the PDU session; means for determining that information needs to be transmitted to the UE; means for determining, based on the policy configuration information, service priority information corresponding to the information that needs to be transmitted to the UE; and means for transmitting signaling to a third network entity for paging the UE about the information that needs to be transmitted to the UE, wherein the signaling includes an indication of the service priority information corresponding to the information that needs to be transmitted to the UE.

Certain aspects provide a non-transitory computer-readable medium for wireless communication by a network entity. The non-transitory computer-readable medium generally includes instructions that, when executed by at least one processor, cause the at least one processor to receive a physical data unit (PDU) session establishment request for a user equipment (UE); receive, from a second network entity, policy configuration information for the PDU session, wherein the policy configuration information includes service priority information associated with the PDU session; determine that information needs to be transmitted to the UE; determine, based on the policy configuration information, service priority information corresponding to the information that needs to be transmitted to the UE; and transmit signaling to a third network entity for paging the UE about the information that needs to be transmitted to the UE, wherein the signaling includes an indication of the service priority information corresponding to the information that needs to be transmitted to the UE.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
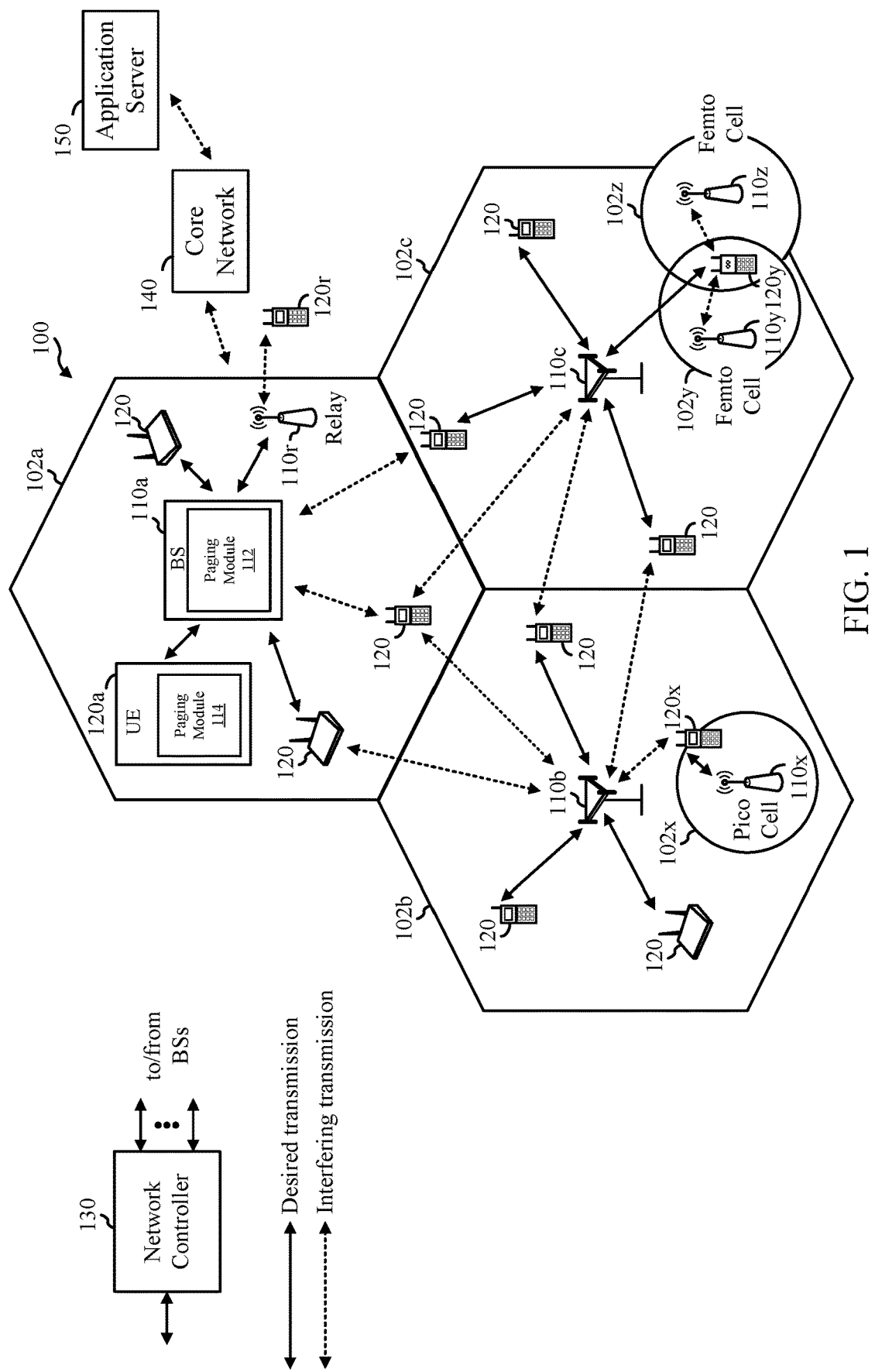
FIG. 1 is a block diagram conceptually illustrating an example telecommunications system, in accordance with certain aspects of the present disclosure.

Aspects of the present disclosure provide apparatus, methods, processing systems, and computer readable mediums for multi-SIM user equipment (UE) paging. A multi-USIM UE may be capable of communicating with a first network using a first SIM and communicating with a second network using a second SIM (or a second set of credentials for the second network stored in the first SIM). In certain cases, communications with the first network and the second network share a same TX/RX chain. In such a case, when the UE receives a paging message associated with the second network while communicating with the first network, the UE may tune to the second network to receive information, potentially interrupting the key services in a first network.

Thus, aspects of the present disclosure provide techniques that allow a UE to decide whether to respond to the paging message in the second network. For example, in some cases, service priority information may be included within paging messages that indicates a priority associated with the information to be received corresponding to the paging message. The UE may use the service priority information to determine whether to respond to or ignore the paging message.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as. Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP) cdma2000 and UMB are described in documents from an organization named "3rd Generation Partnership Project 2" (3GPP2).

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 130. The core network 130 may in communication with one or more BS s 110 and/or UEs 120 via one or more interfaces, as well with an application server 140, as discussed more detail below with respect to FIG. 2. As shown in FIG. 1, the UE 120a includes a paging module 114 that may be configured to perform the operations illustrated in one or more of FIGS. 4-11, as well as other operations described herein for service priority information for multi-SIM UE paging. Additionally, for example, as shown in FIG. 1, the BS 110a also includes a paging module 112 that may be configured to perform the operations illustrated in one or more of FIGS. 4-11, as well as other operations described herein for service priority information for multi-SIM UE paging.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. In some examples, a cell may not necessarily be stationary, and the geographic area of the cell may move according to the location of a mobile BS. In some examples, the BSs may be interconnected to one another and/or to one or more other BSs or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

The wireless communication network 100 may be part of a radio access network (RAN) which may be in communication with a core network (CN) 140. In turn the CN 140 may be in communication with an application provider, for example, via an application server (AS) 150. Aspects of the CN 140 are described in greater detail below with respect to FIG. 2.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

NR may utilize OFDM with a CP on the uplink and downlink and include support for half-duplex operation using TDD. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In FIG. 1, a solid line with double arrows indicates desired transmissions between a UE and a serving BS, which is a BS designated to serve the UE on the downlink and/or uplink. A finely dashed line with double arrows indicates potentially interfering transmissions between a UE and a BS.

Figure 2:
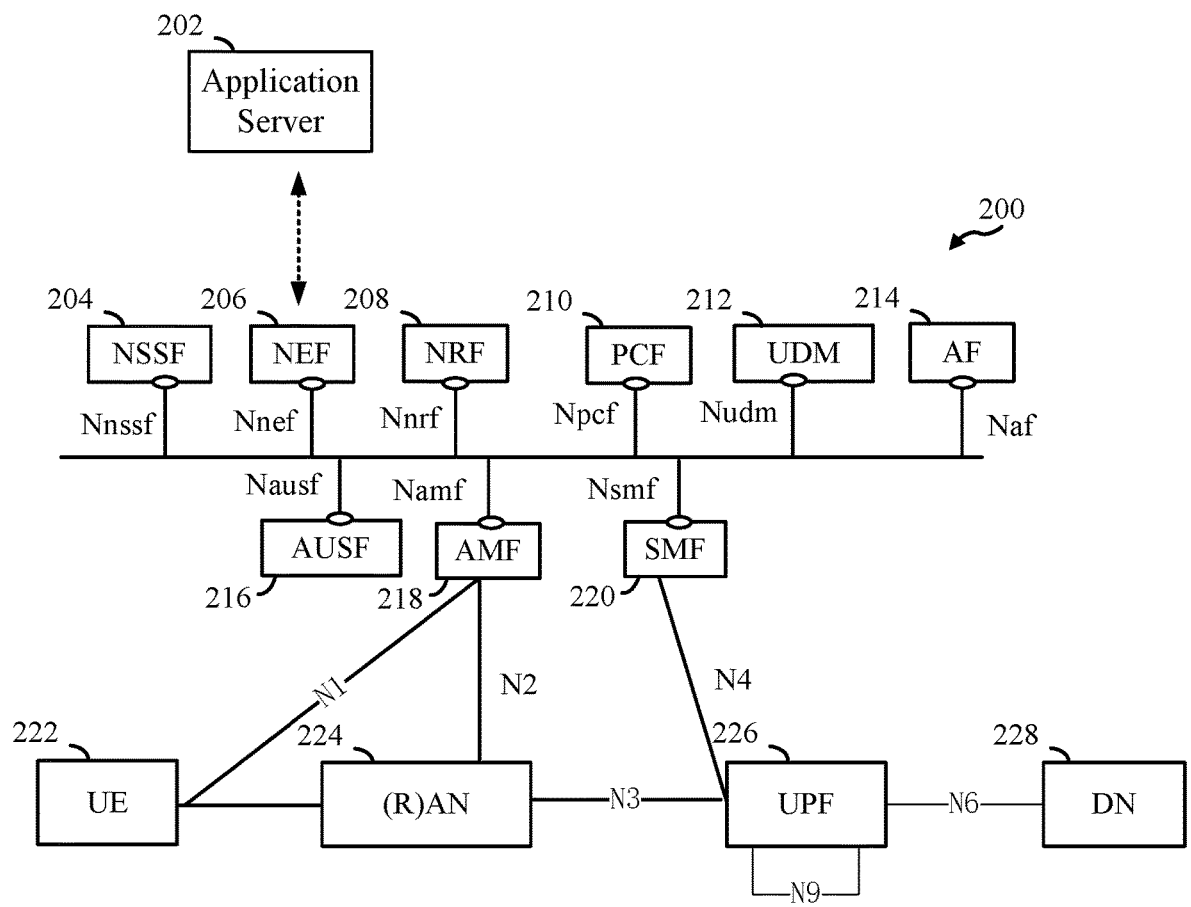
FIG. 2 is a block diagram illustrating an example architecture of a core network and radio access network (RAN) in communication with an application server (AS), in accordance with certain aspects of the present disclosure.

FIG. 2 is a block diagram illustrating an example architecture of a CN 200 (e.g., such as the CN 140 in FIG. 1) in communication with a RAN 224 and AS 202 (e.g., such as the AS 150 in FIG. 1), in accordance with certain aspects of the present disclosure. As shown in FIG. 2, the example architecture includes the CN 200, RAN 224, UE 222, and data network (DN) 228 (e.g. operator services, Internet access or third party services).

The CN 200 may host core network functions. CN 200 may be centrally deployed. CN 200 functionality may be offloaded (e.g., to advanced wireless services (AWS)), in an effort to handle peak capacity. As shown in FIG. 2, the example CN 200 may be implemented by one or more network entities that perform network functions (NF) including Network Slice Selection Function (NSSF) 204, Network Exposure Function (NEF) 206, NF Repository Function (NRF) 208, Policy Control Function (PCF) 210, Unified Data Management (UDM) 212, Application Function (AF) 214, Authentication Server Function (AUSF) 216, Access and Mobility Management Function (AMF) 218, Session Management Function (SMF) 220; User Plane Function (UPF) 226, and various other functions (not shown) such as Unstructured Data Storage Function (UDSF); Unified Data Repository (UDR); 5G-Equipment Identity Register (5G-EIR); and/or Security Edge Protection Proxy (SEPP).

The AMF 218 may include the following functionality (some or all of the AMF functionalities may be supported in one or more instances of an AMF): termination of RAN control plane (CP) interface (N2); termination of non-access stratum (NAS) (e.g., N1), NAS ciphering and integrity protection; registration management; connection management; reachability management; mobility management; lawful intercept (for AMF events and interface to L1 system); transport for session management (SM) messages between UE 222 and SMF 220; transparent proxy for routing SM messages; access authentication; access authorization; transport for short message service (SMS) messages between UE 222 and a SMS function (SMSF); Security Anchor Functionality (SEAF); Security Context Management (SCM), which receives a key from the SEAF that it uses to derive access-network specific keys; Location Services management for regulatory services; transport for Location Services messages between UE 222 and a location management function (LMF) as well as between RAN 224 and LMF; evolved packet service (EPS) bearer ID allocation for interworking with EPS; and/or UE mobility event notification; and/or other functionality.

SMF 220 may support: session management (e.g., session establishment, modification, and release), UE IP address allocation and management, dynamic host configuration protocol (DHCP) functions, termination of NAS signaling related to session management, downlink data notification, and traffic steering configuration for UPF for proper traffic routing. UPF 226 may support: packet routing and forwarding, packet inspection, quality-of-service (QoS) handling, external protocol data unit (PDU) session point of interconnect to DN 228, and anchor point for intra-RAT and inter-RAT mobility. PCF 210 may support: unified policy framework, providing policy rules to control protocol functions, and/or access subscription information for policy decisions in UDR. AUSF 216 may acts as an authentication server. UDM 212 may support: generation of Authentication and Key Agreement (AKA) credentials, user identification handling, access authorization, and subscription management. NRF 208 may support: service discovery function, and maintain NF profile and available NF instances. NSSF may support: selecting of the Network Slice instances to serve the UE 222, determining the allowed network slice selection assistance information (NSSAI), and/or determining the AMF set to be used to serve the UE 222. Additionally, in some cases, SMF 220, UPF 226, PCF 210, AMF 218, and RAN 224 may be configured to perform operations for service priority information for multi-SIM UE paging, according to certain aspects described herein.

NEF 206 may support: exposure of capabilities and events, secure provision of information from external application to 3GPP network, translation of internal/external information. AF 214 may support: application influence on traffic routing, accessing NEF 206, and/or interaction with policy framework for policy control.

Figure 3:
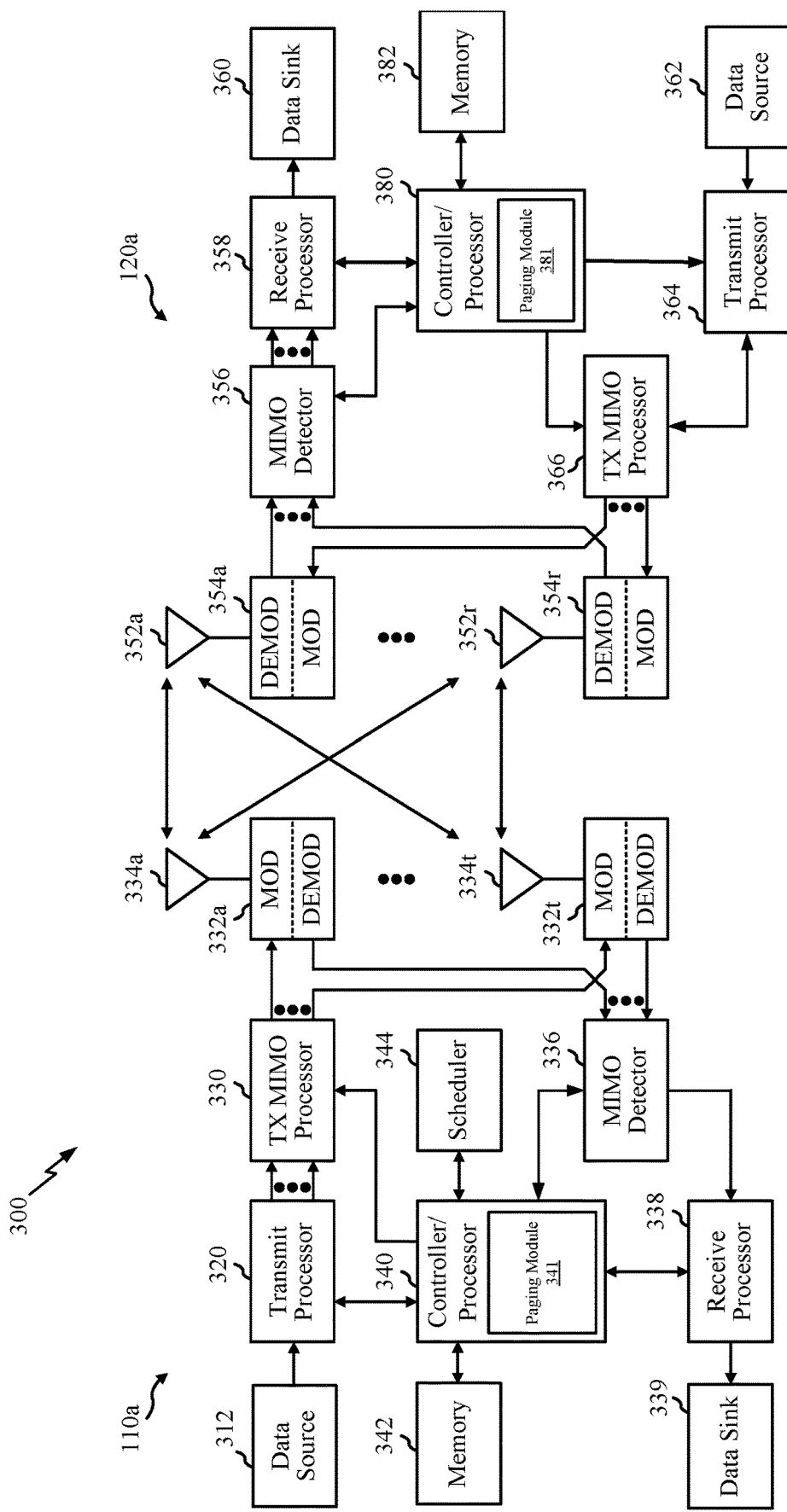
FIG. 3 is a block diagram conceptually illustrating a design of an example base station (BS) and user equipment (UE), in accordance with certain aspects of the present disclosure.

FIG. 3 illustrates example components of BS 110 and UE 120 (e.g., in the wireless communication network 100 of FIG. 1), which may be used to implement aspects of the present disclosure. For example, antennas 352, processors 366, 358, 364, and/or controller/processor 380 of the UE 120 and/or antennas 334, processors 320, 330, 338, and/or controller/processor 340 of the BS 110 may be used to perform the various techniques and methods described herein. For example, as shown in FIG. 3, the controller/processor 340 of the BS 110 includes a paging module 341 that may be configured to perform the operations illustrated in one or more of FIGS. 4-11, as well as other operations described herein for service priority information for multi-SIM UE paging. Additionally, for example, as shown in FIG.

3, the controller/processor 380 of the UE 120 also includes a paging module 381 that may be configured to perform the operations illustrated in one or more of FIGS. 4-11, as well as other operations described herein for service priority information for multi-SIM UE paging.

At the BS 110, a transmit processor 320 may receive data from a data source 312 and control information from a controller/processor 340. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 320 may process (e.g., encode and symbol map) the data and control information to obtain data symbols and control symbols, respectively. The transmit processor 320 may also generate reference symbols, such as for the primary synchronization signal (PSS), secondary synchronization signal (SSS), and cell-specific reference signal (CRS). A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a-332t. Each modulator 332 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 332a-332t may be transmitted via the antennas 334a-334t, respectively.

At the UE 120, the antennas 352a-352r may receive the downlink signals from the BS 110 and may provide received signals to the demodulators (DEMODs) in transceivers 354a-354r, respectively. Each demodulator 354 may condition (e.g., filter, amplify, downconvert, and digitize) a respective received signal to obtain input samples. Each demodulator may further process the input samples (e.g., for OFDM, etc.) to obtain received symbols. A MIMO detector 356 may obtain received symbols from all the demodulators 354a-354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at UE 120, a transmit processor 364 may receive and process data (e.g., for the physical uplink shared channel (PUSCH)) from a data source 362 and control information (e.g., for the physical uplink control channel (PUCCH) from the controller/processor 380. The transmit processor 364 may also generate reference symbols for a reference signal (e.g., for the sounding reference signal (SRS)). The symbols from the transmit processor 364 may be precoded by a TX MIMO processor 366 if applicable, further processed by the demodulators in transceivers 354a-354r (e.g., for SC-FDM, etc.), and transmitted to the base station 110. At the BS 110, the uplink signals from the UE 120 may be received by the antennas 334, processed by the modulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the BS 110 and the UE 120, respectively. The controller/processor 340 and/or other processors and modules at the BS 110 may perform or direct the execution of processes for the techniques described herein. The memories 342 and 382 may store data and program codes for BS 110 and UE 120, respectively. A scheduler 344 may schedule UEs for data transmission on the downlink and/or uplink.

Example Service Priority Information for Multi-SIM User Equipment Paging

A user equipment (UE), such as UE 120, may include more than one subscriber identity module (SIM) and/or universal subscriber identity module (USIM). A UE with more than one SIM may be referred to as a multi-SIM device. In the present disclosure, a SIM may refer to a SIM or a USIM. Each SIM may also include a unique International Mobile Subscriber Identity (IMSI) and service subscription information (e.g., UE service credentials). Each SIM may be configured to operate in a particular radio access technology (RAT), allowing the UE to communicate using different RATs using each individual SIM.

Many multi-SIM devices support multi-SIM multi-standby operation using a single radio frequency (RF) chain to transmit and receive communications. A multi-SIM device implementation may use common radio and baseband components that are shared among the multiple SIMs. For example, in some cases, a multi-SIM device may include a first SIM dedicated to operate in a first network (e.g., associated with a first RAT) and a second SIM dedicated to operate in a second network (e.g., associated with a second RAT), both SIMs using a single RF chain to transmit and receive communications.

In some cases, while communicating in a dedicated mode with the first network, the UE may detect a page in the second network, causing the UE to suspend all operations in the first network and to transition to the second network to respond to the page, regardless of the type (or priority) of information to which the page in the second network corresponds. For example, in some cases, even if the page corresponds to low priority information, the UE may still transition to the second network and suspend all operations in the first network, which may involve interrupting key services in the first network. In some cases, the key services may be defined by a user of the UE and may include services such as IMS voice service, a game service used by the user or other service, and the like.

Thus, to avoid the negative effects of interrupting the key services in a first network (e.g., associated with a first SIM) due to a paging message detected in a second network (e.g., associated with a second SIM), aspects of the present disclosure provide techniques that allow a UE to decide whether to respond to the paging message in the second network. For example, in some cases, service priority information may be included within the paging message transmitted in the second network that allows a UE to determine whether to establish a connection in the second network in response to the paging message.

Figure 4:
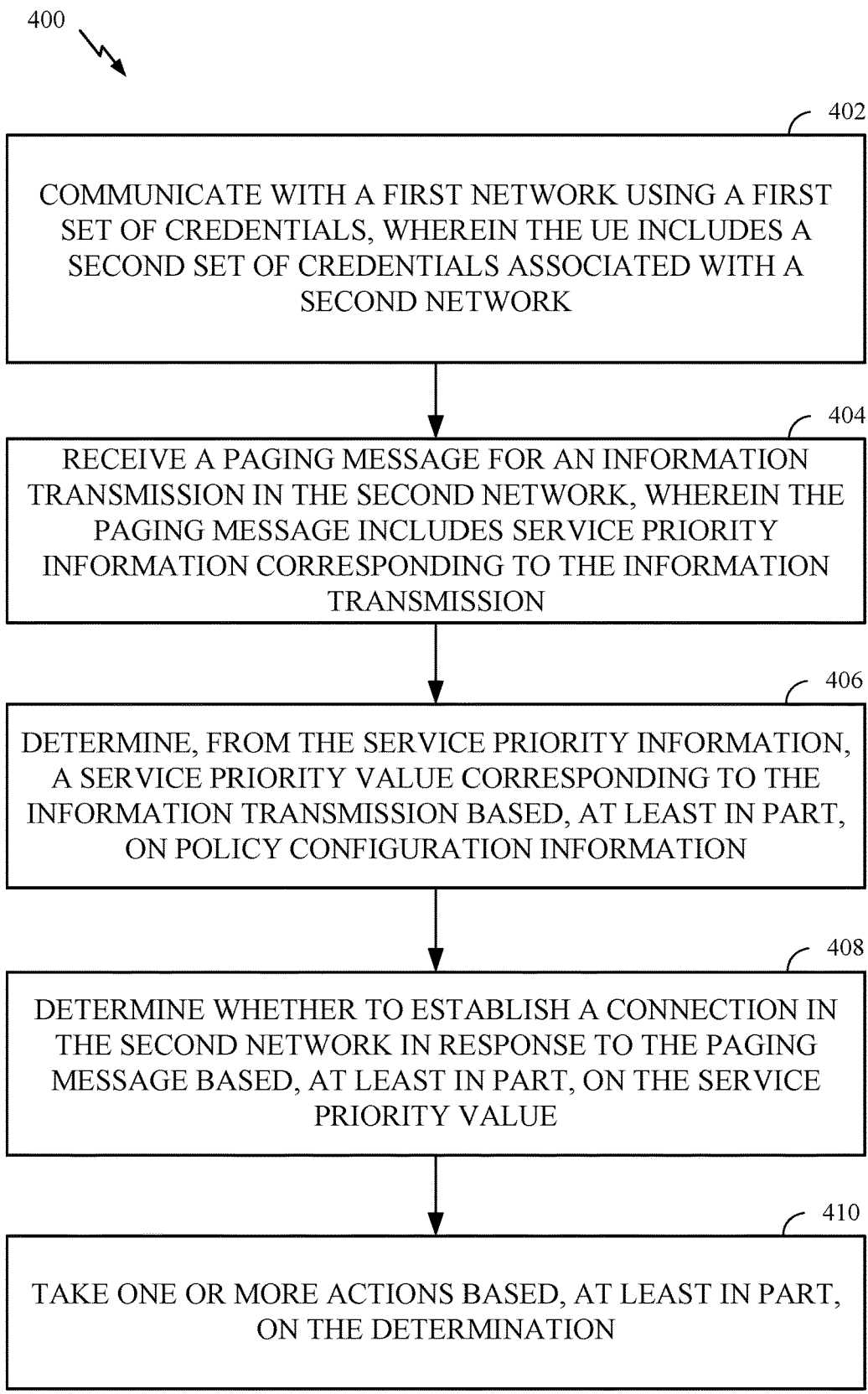
FIG. 4 is a flow diagram illustrating example operations for wireless communications by a user equipment (UE), in accordance with certain aspects of the present disclosure.

FIG. 4 is a flow diagram illustrating example operations 400 for wireless communication, in accordance with certain aspects of the present disclosure. The operations 400 may be performed, for example, by a first wireless node, such as a UE (e.g., such as a UE 120 in the wireless communication network 100).

Operations 400 may be implemented as software components that are executed and run on one or more processors (e.g., controller/processor 380 of FIG. 3). Further, the transmission and reception of signals by the UE in operations 400 may be enabled, for example, by one or more antennas (e.g., antennas 352 of FIG. 3). In certain aspects, the transmission and/or reception of signals by the UE may be implemented via a bus interface of one or more processors (e.g., controller/processor 380) obtaining and/or outputting signals.

Operations 400 begin by communicating with a first network using a first set of credentials, wherein the UE includes a second set of credentials associated with a second network. In some cases, the first set of credentials are stored in a first universal subscriber identity module (USIM). Additionally, in some cases, the second set of credentials are stored in one of the first USIM or a second USIM.

At 404, the UE receives a paging message for an information transmission in the second network, wherein the paging message includes service priority information corresponding to the information transmission.

At 406, the UE determines, from the service priority information, a service priority value corresponding to the information transmission based, at least in part, on policy configuration information.

At 408, the UE determines whether to establish a connection in the second network in response to the paging message based, at least in part, on the service priority value.

At 410, the UE takes one or more actions based, at least in part, on the determination.

Figure 5:
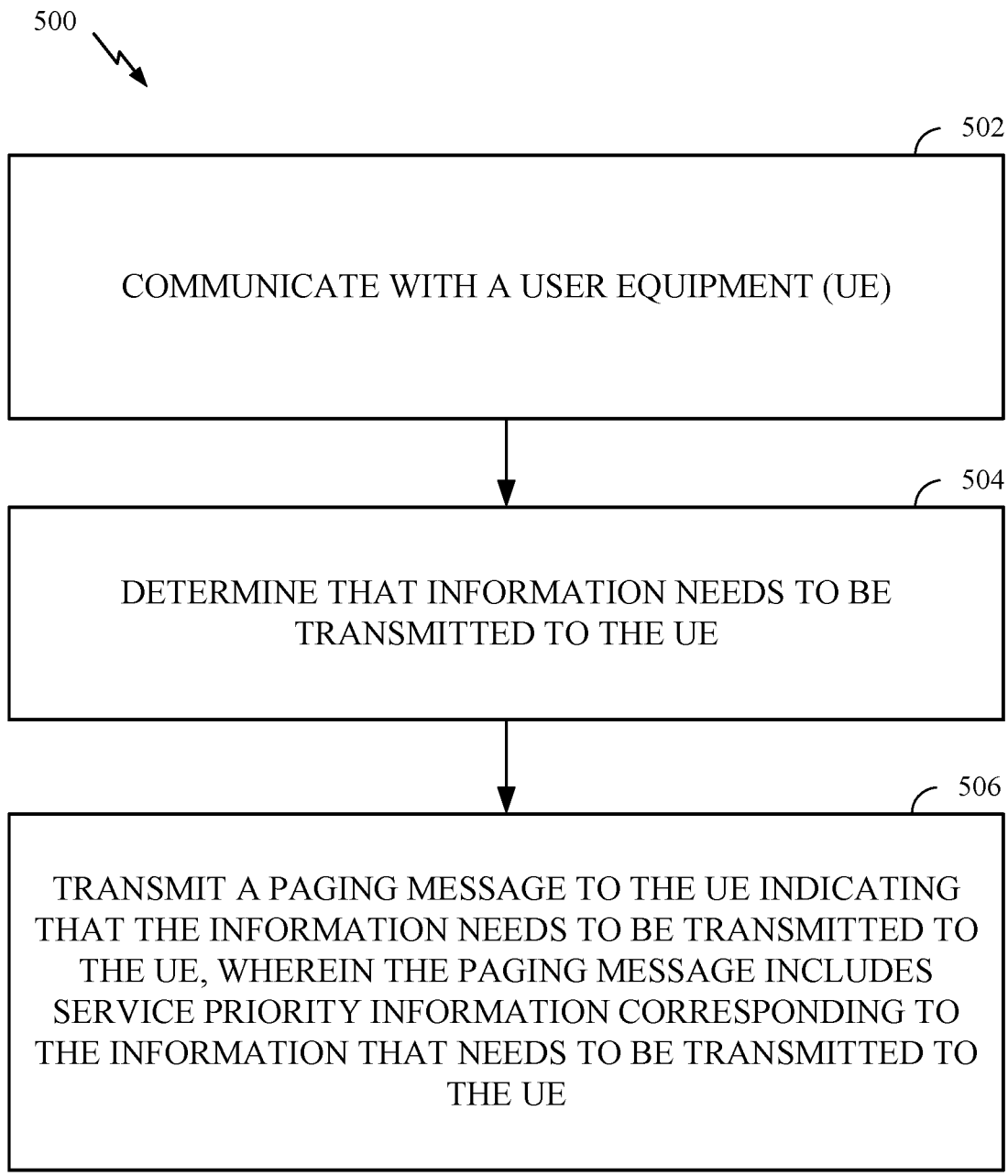
FIG. 5 is a flow diagram illustrating example operations for wireless communications by a network entity, in accordance with certain aspects of the present disclosure.

FIG. 5 is a flow diagram illustrating example operations 500 for wireless communication, in accordance with certain aspects of the present disclosure. The operations 500 may be performed by a network entity, for example, an entity in a RAN. According to aspects, operations 500 may be considered as complimentary to operations 400 performed by the UE.

Operations 500 begin at 502 by communicating with a user equipment (UE).

At 504, the network entity determines that information needs to be transmitted to the UE.

At 506, the network entity transmits a paging message to the UE indicating that the information needs to be transmitted to the UE, wherein the paging message includes service priority information corresponding to the information that needs to be transmitted to the UE.

Figure 6:
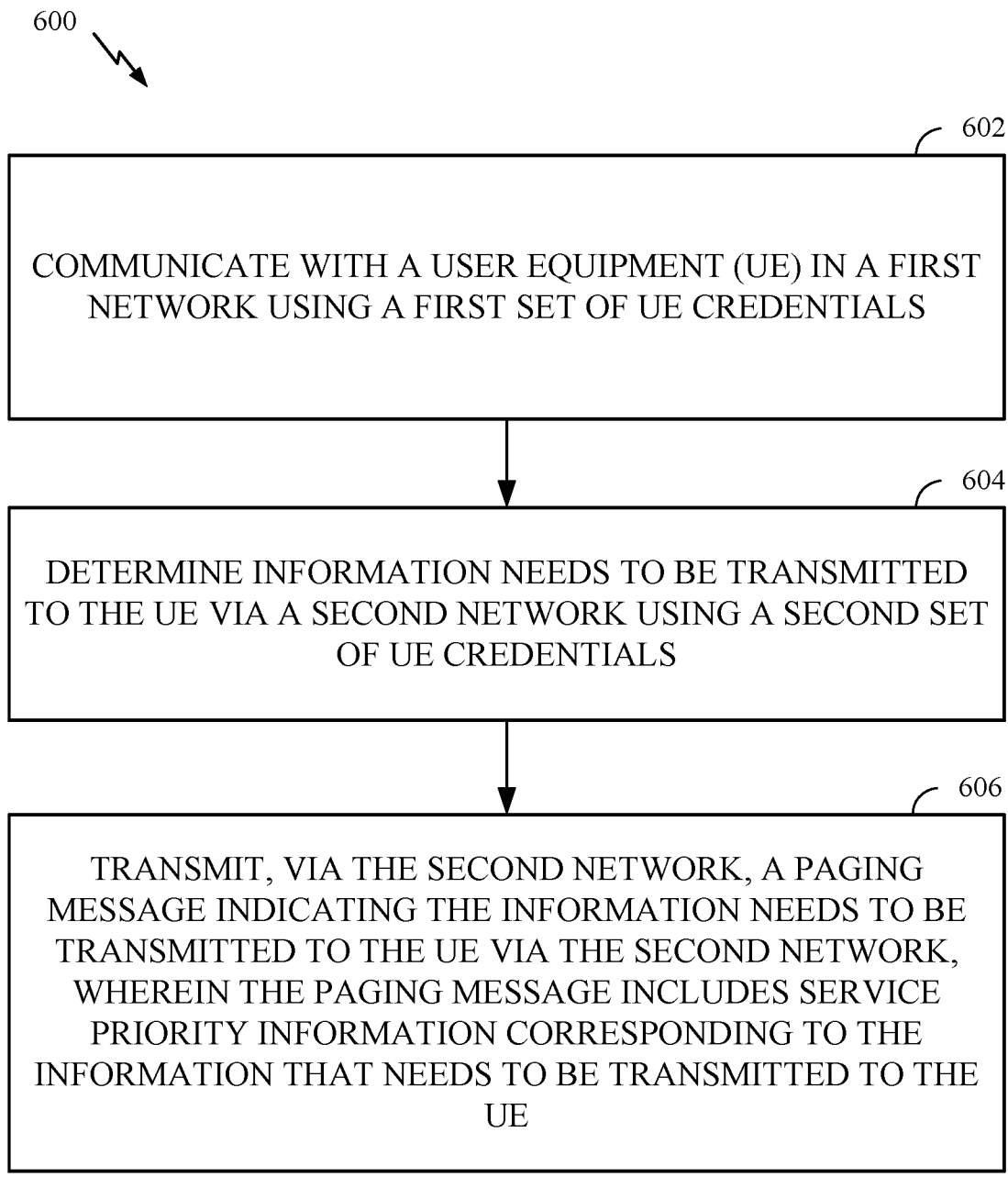
FIG. 6 is a flow diagram illustrating example operations for wireless communications by a network entity, in accordance with certain aspects of the present disclosure.

FIG. 6 is a flow diagram illustrating example operations 600 for wireless communication, in accordance with certain aspects of the present disclosure. The operations 600 may be performed by a network entity, for example, an entity in a core network. According to aspects, operations 600 may be considered as complimentary to operations 400 and 500.

Operations 600 begin at 602 by communicating with a user equipment (UE) in a first network using a first set of UE credentials.

At 604, the network entity determines information needs to be transmitted to the UE via a second network using a second set of UE credentials.

At 606, the network entity transmits, via the second network, a paging message indicating the information needs to be transmitted to the UE via the second network, wherein the paging message includes service priority information corresponding to the information that needs to be transmitted to the UE.

Figure 7:
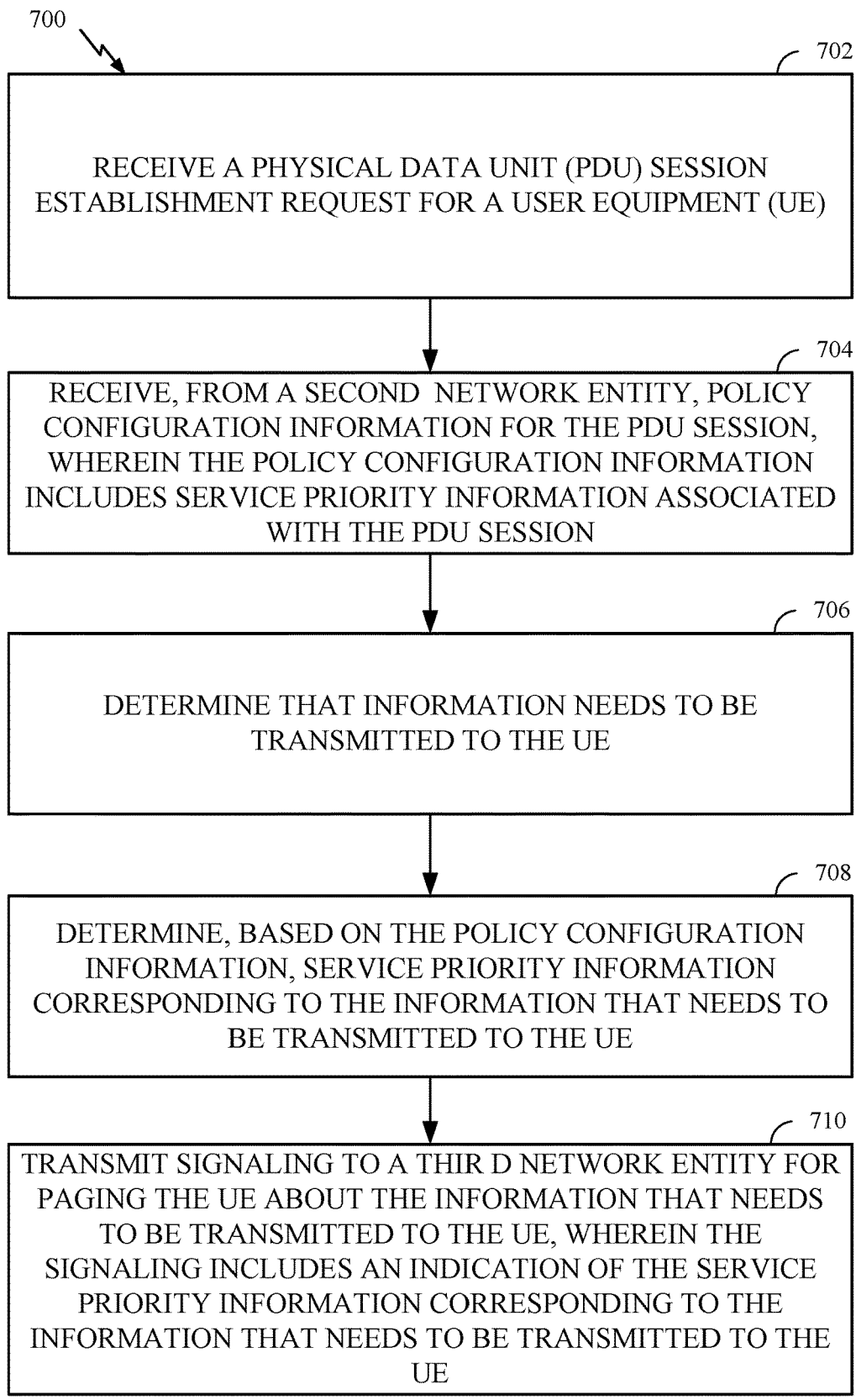
FIG. 7 is a flow diagram illustrating example operations for wireless communications by a network entity, in accordance with certain aspects of the present disclosure.

FIG. 7 is a flow diagram illustrating example operations 700 for wireless communication, in accordance with certain aspects of the present disclosure. The operations 700 may be performed by a network entity, for example, an entity in a core network, such as a session management function (SMF). According to aspects, operations 700 may be considered as complimentary to operations 400, 500, and 600.

Operations 700 begin at 702 by receiving a physical data unit (PDU) session establishment request for a user equipment (UE).

At 704, the SMF receives, from a second network entity, policy configuration information for the PDU session, wherein the policy configuration information includes service priority information associated with the PDU session. In some cases, the second network entity may comprise a policy control function (PCF) in the core network.

At 706, the SMF determines that information needs to be transmitted to the UE.

At 708, the SMF determines, based on the policy configuration information, service priority information corresponding to the information that needs to be transmitted to the UE.

At 710, the SMF transmits signaling to a third network entity for paging the UE about the information that needs to be transmitted to the UE, wherein the signaling includes an indication of the service priority information corresponding to the information that needs to be transmitted to the UE. In some cases, the third network entity may comprise an access and mobility management function (AMF).

As noted above, aspects of the present disclosure provide techniques that allow a UE to decide whether to respond to the paging message in the second network, which, in some cases, includes providing service priority information within the paging message that allows a UE to determine whether to establish a connection in the second network in response to the paging message.

For example, in some cases, the UE may communicate with a first network (e.g., via a first RAT, such as 5G) using a first set of credentials. In some cases, the first set of credentials may be stored in a first universal subscriber identity module (USIM). Additionally, the UE may include a second set of credentials for communicating in a second network (e.g., via a second RAT, such as LTE). In some cases, the second set of credentials may be stored in one of the first USIM or a second USIM. In some cases, the UE may not be capable of simultaneous communication with both the first network and the second network (e.g., because the first RAT and second RAT share the same Tx/Rx chains).

In some cases, while communicating with the first network, the UE may receive a paging message for an information transmission in the second network, for example, indicating that information needs to be transmitted to the UE in the second network. According to aspects, in order to allow the UE to determine whether or not to respond to the paging message as described above, the paging message may include service priority information corresponding to the information transmission. The service priority information may include a service priority value associated with the information transmission that may indicate to the UE a priority of the information that needs to be transmitted to the UE. For example, in some cases, the service priority value may indicate that the information transmission is low priority (e.g., or may indicate a type of the information transmission that the UE understands as low priority information). In other cases, the service priority value may indicate that the information transmission is high priority (e.g., or may indicate a type of the information transmission that the UE understands as high priority information). For example, in some cases, IMS voice may be defined as important while all the other QoS flows may be defined as non-important. In such a case, when the service priority information in a paging message indicates a service priority value corresponding to IMS voice data, the UE may understand that the information transmission corresponds to high priority information. Additionally, the service priority information may also include a range of different values to indicate different levels of priority. As explained below, the UE may act in a determined manner based on the service priority value to choose whether or not to respond to a paging message.

According to aspects, the UE may determine the service priority value (e.g., corresponding to the information transmission) from the service priority information based, at least in part, on policy configuration information received from the core network (e.g., via RAN/base station). According to aspects, the policy configuration information may indicate how to interpret the service priority information to determine the service priority value. For example, in some cases, the policy configuration information may include a set of values each associated with a different type of information or indicating a different priority associated with different types of information. Accordingly, the UE may compare the service priority information included in the paging message with the set of values/different priorities from the policy configuration information to determine the service priority value corresponding to the information transmission.

In some cases, the policy configuration information may be received in an Open Mobile Alliance (OMA) Device Management (DM) message. In other cases, the policy configuration information may be received in at least one of system information in a radio resource control (RRC) message or in an RRC unicast message. In yet other cases, the policy configuration information may be received in a non-access stratum (NAS) message. For example, in some cases, the NAS message may be received in response to a physical data unit (PDU) session establishment or modification procedure and may comprise a PDU session establishment or modification response message. Additionally, in some cases, the NAS message may be received in response to Registration procedure and may comprise a Registration Accept message.

According to aspects, once the priority value associated with the information transmission has been determined, the UE determine whether to establish a connection in the second network in response to the paging message based, at least in part, on the service priority value. The UE may then take one or more actions based, at least in part, on the determination.

For example, in some cases, the UE may determine not to establish the connection in the second network based on the service priority value and may ignore the paging message and continue to communicate with the first network. For example, in some cases, the service priority value may indicate that the information transmission includes low priority information (e.g., internet traffic). In this case, instead of potentially disrupting key services in the first network as discussed above, the UE may choose to take action to ignore the paging message in the second network since the information transmission in the second network is low priority.

In other cases, the UE may determine to establish the connection in the second network. In this case, that UE may establish the connection in the second network and receive the information transmission in the second network. For example, in some cases, the service priority value may indicate that the information transmission includes high priority information (e.g., IMS voice). In this case, the UE may choose to transition away from the first network (and potentially disrupt key services in the first network) and take action to establish a connection in the second network to receive the information transmission.

Figure 8:
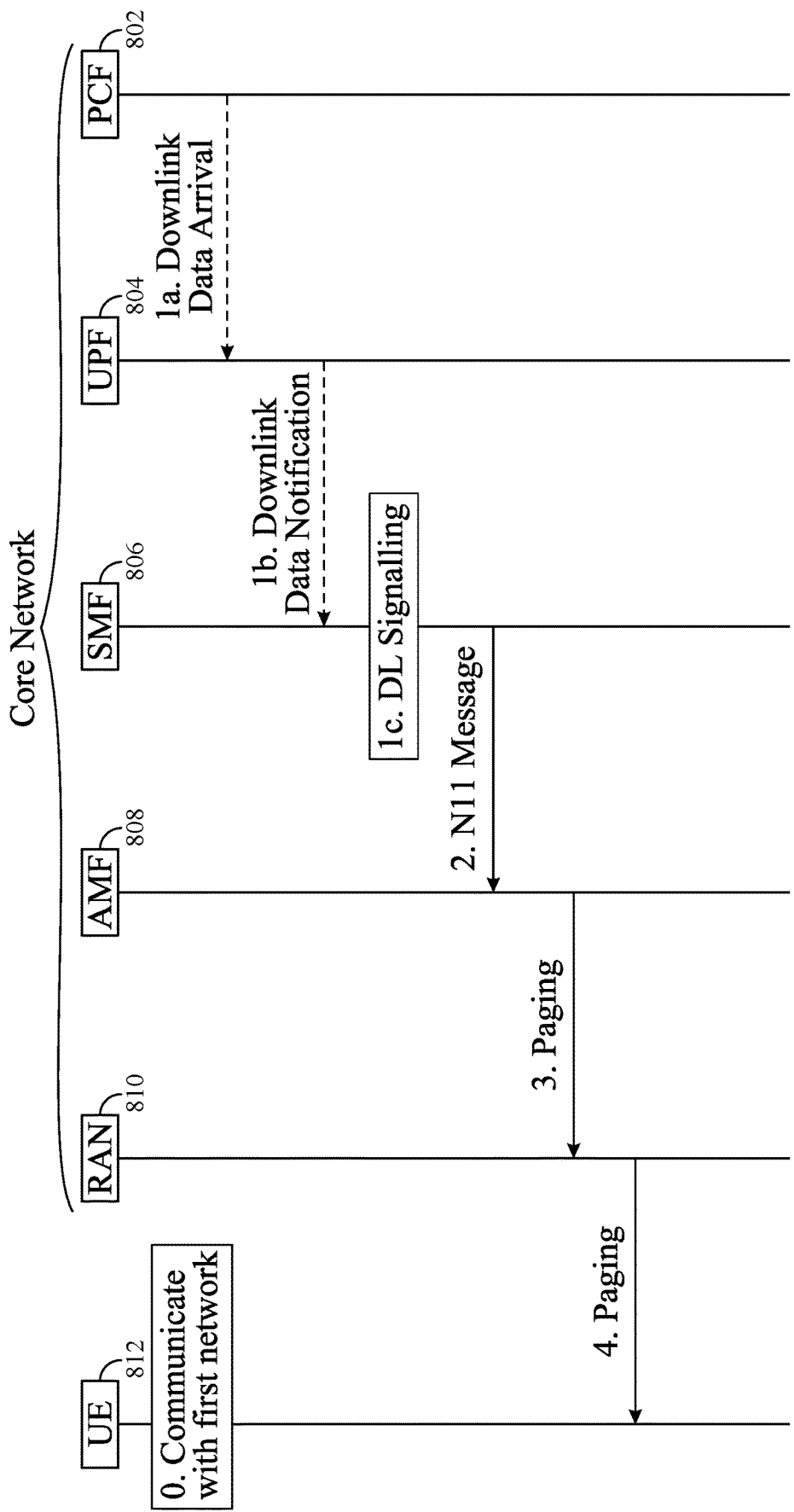
FIG. 8 is a call flow diagram illustrating an exemplary paging procedure, in accordance with certain aspects of the present disclosure.

Aspects of the present disclosure will now go into greater detail regarding the signaling required for paging a UE using the techniques described herein. For example, FIG. 8 illustrates an example call flow for paging a UE in current 5G systems. In some cases, the UE may be a multi-USIM device capable of communicating with a first network using a first SIM and communicating with a second network using a second SIM (or a second set of credentials for the second network stored in the first SIM), as discussed above.

According to aspects, as illustrated, at step 0, the UE 812 may be actively communicating with the first network. At step 1a, the PCF 802 may transmit a downlink data arrival message to the UPF 804, indicating that there is an information transmission for the UE 812 associated with the second network. Thereafter, as illustrated at step 1b, the UPF 804 transmits a downlink data notification message to the SMF 806, indicating the information transmission for the UE 812 associated with the second network. At step 1c, the SMF 806 determines that downlink signaling associated with the second network (e.g., including the information transmission) needs to be transmitted to the UE and, at step 2, transmits an Namf_Communication_N1N2MessageTransfer message to the AMF 808 on an N11 interface. The Namf_Communication_N1N2MessageTransfer message may be a standardized message sent between the SMF 806 and AMF 808 and used to transparently send an N1SM NAS message from the SMF 806 to the UE 804 and an N2SM message from the SMF 806 to the RAN 810.

Thereafter, the AMF 808 may detect that the UE is in IDLE mode and, at step 3, sends a paging message to RAN 812. The RAN 812 may then forward the paging message to the UE at step 4, indicating that the UE is being paged by the second network. In some cases, the paging message may be sent by the RAN 810 to the UE 812 at step 4 on a Uu interface.

In current systems, the AMF 808 may send the paging message to RAN 810 only including a paging ID and registration area information associated with the second network, but no information that relates to the services corresponding to the paging message. Accordingly, when UE receives the paging message at step 4 in FIG. 8 associated with the second network, the UE may not know the service that triggered the paging and therefore cannot make a decision whether or not to respond to the paging message. As discussed above, if the UE chooses to respond to the paging message, the UE may potentially disrupt key services associated with the first network.

Thus, as noted above, for the multi-USIM UEs, it may be advantageous to provide the UE with service priority information in the paging message (e.g., using techniques described above) to avoid the interruption of key services in the other systems, such as the first network. As the general concept of providing service priority information within a paging message has been described above, aspects of the present disclosure will now describe in greater details techniques for configuring a service priority in the core network and how to indicate the service priority in the paging message.

Figure 9:
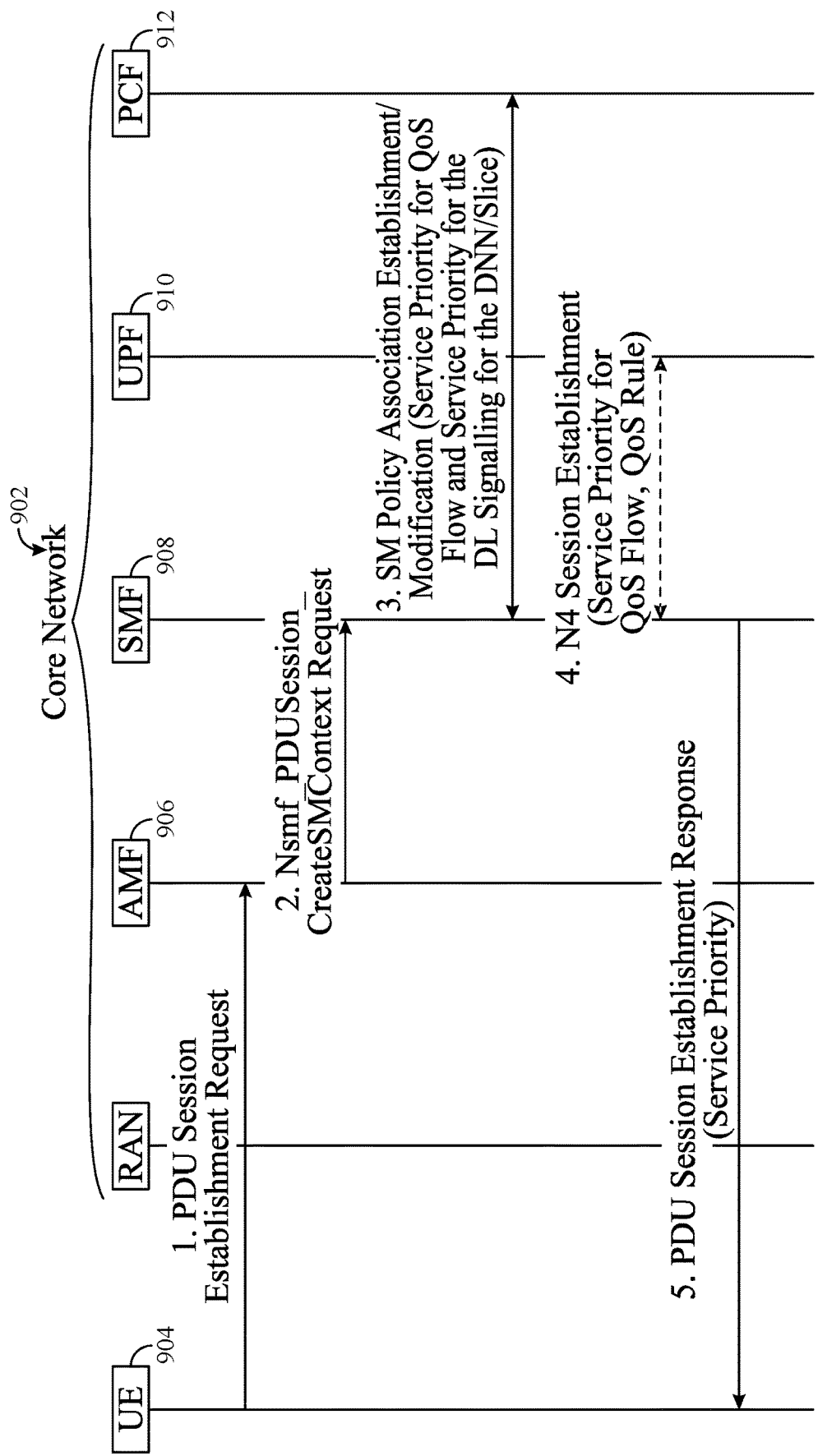
FIG. 9 is a call flow diagram illustrating an exemplary procedure for configuring a service priority in a core network, in accordance with certain aspects of the present disclosure.

FIG. 9 illustrates an example call flow for configuring a service priority in the core network 902, according to certain aspects presented herein. As illustrated, the service priority in the core network 902 may be configured during a packet data unit (PDU) establishment/modification procedure/QoS establishment procedure initiated by the UE 904. For example, as illustrated, at step 1, the UE 904 may transmit a PDU session establishment request to the AMF 906 for communicating in the second network using a second set of credentials, as described above. According to aspects, the UE may also be communicating in a first network using a first set of credentials, as described above.

At step 2, in response to receiving the PDU session establishment request, the AMF 906 may transmit an Nsmf_PDUSession_CreateSMContext request to the SMF 908. The Nsmf_PDUSession_CreateSMContext request may be a standardized message used for establishing a new PDU session.

At step 3, during the PDU session establishment procedure, the SMF 908 may interact with the PCF 912 to obtain policy configuration information for the PDU session initiated by the UE. The PCF 912 may include, in the policy configuration information, a service priority for a QoS flow and a service priority for downlink signaling for a data network name/slice requested in the PDU session establishment request. In some cases, during a PDU session modification procedure, if a new QoS rule is allocated for the PDU session, the service priority for the new allocated QoS flow may be included in a policy and charging control (PCC) rule sent from PCF 912 to SMF 908.

At step 4, after receiving the policy configuration information from the PCF 912, the SMF 908 may send an N4 session establishment/modification procedure message to UPF 910, which may include the QoS rule for the QoS flow. Additionally, in some cases, the N4 session establishment/modification procedure message sent to the UPF 910 may optionally include the service priority for QoS flow.

Thereafter, as illustrated at step 5, the SMF 908 may transmit a PDU session establishment response message to the UE 904. The PDU session establishment response message may include the policy configuration information for the PDU session initiated by the UE. As noted, the policy configuration information may include the service priority for the QoS flow and the service priority for the downlink signaling for the data network name/slice requested in the PDU session establishment request.

According to aspects, once the service priority has been configured in the core network 902, the service priority configuration may be used when transmitting paging messages to the UE 904. The techniques for transmitting the paging messages to the UE may depend on whether the UE is in an idle mode or in an RRC inactive mode, as explained below.

Figure 10:
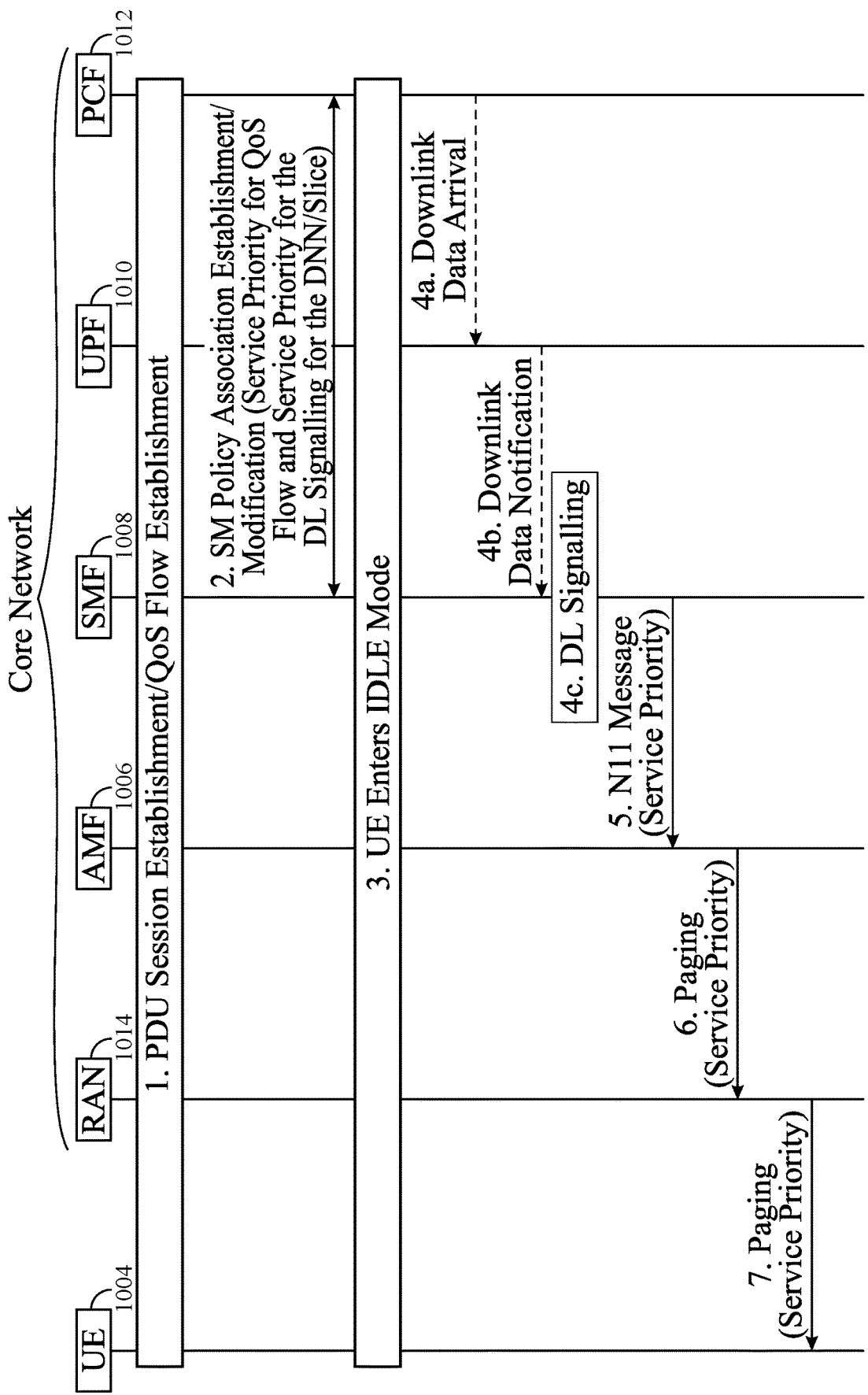
FIG. 10 is a call flow diagram illustrating an exemplary procedure for transmitting a paging message to the UE in an idle mode, in accordance with certain aspects of the present disclosure.

FIG. 10 illustrates an example call flow for transmitting a paging message to the UE in an idle mode, according to certain aspects presented here. As illustrated, steps 1 and 2 of FIG. 10 may be the same as steps 1-3 in FIG. 9 with the UE 1004 initiating a PDU session establishment/QoS establishment procedure in the second network and the SMF 1008 retrieving the service priority (e.g., the policy configuration information) from the PCF 1012.

After the PDU session/QoS flow has been established, the UE 1004 may enter an idle mode at step 3.

At step 4a, downlink data associated with the second network may arrive at the UPF 1010.

According to aspects, at step 4b, if the SMF 1008 did not send the service priority to the UPF 1010 (e.g., in the N4 message discussed above) during the PDU session establishment procedure, the UPF 1010 may transmit a downlink data notification to the SMF 1008, including QoS flow information. According to aspects, based on the downlink data notification message, the SMF 1008 may determine that information needs to be transmitted to the UE 1004. The SMF 1008 may then determine a service priority for the QoS flow identified in the QoS flow information in the downlink data notification, for example, according to the received policy configuration information from PCF 1012.

According to aspects, if the SMF 1008 did send the service priority to the UPF 1010 (e.g., in the N4 message discussed above), the UPF 1010 determines the service priority for the QoS flow according to the information received from SMF 1008. The UPF 1010 may then include the service priority in the Downlink data Notification sent to the SMF 1008 in step 4b.

Additionally, in some cases, the SMF 1008 may determine that downlink signaling needs to be transmitted to the UE 1004. In this case, at step 4c, the SMF determines the service priority for the DL signaling according to the received policy configuration information from PCF 1012.

Thereafter, the SMF 1008 may transmit signaling to the AMF 1006 for paging the UE 1004 about the information that needs to be transmitted to the UE 1004. In some cases, the signaling may include an indication of the service priority information corresponding to the information that needs to be transmitted to the UE 1004. For example, as illustrated at step 5, the SMF 1008 may send a Namf_Communication_N1N2MessageTransfer message to AMF 1006 on an N11 interface and includes the determined service priority associated with the information that needs to be transmitted to the UE 1004.

According to aspects, if UE is in idle mode and the AMF 1006 decides to transmit paging message to the UE, at step 6, the AMF 1006 may transmit the paging message the RAN 1014 (e.g., the second network), including the service priority associated with the information that needs to be transmitted to the UE 1004.

Thereafter, at step 7, the RAN 1014 may send the paging message with the service priority information on the Uu interface to the UE 1004. In general, the RAN 1014 may communicate with the UE 1004, determine that information needs to be transmitted to the UE 1004 (e.g., in response to receiving the page message from the AMF 1006), and may transmit the paging message to the UE 1004 indicating that the information needs to be transmitted to the UE 1004. As noted, the paging message may include service priority information corresponding to the information that needs to be transmitted to the UE 1004.

According to aspects, the UE may use the service priority information in the paging message to determine whether to establish a connection with the RAN 1014 (e.g., to receive the information that needs to be transmitted) or to ignore the paging message altogether, for example, as described above. For example, as noted, if the paging message includes service priority information corresponding to high priority information, the UE 1004 may decide to respond to the paging message and receive the information from the RAN 1014; otherwise, the UE 1004 may decide to ignore the paging message and not receive the information.

Figure 11:
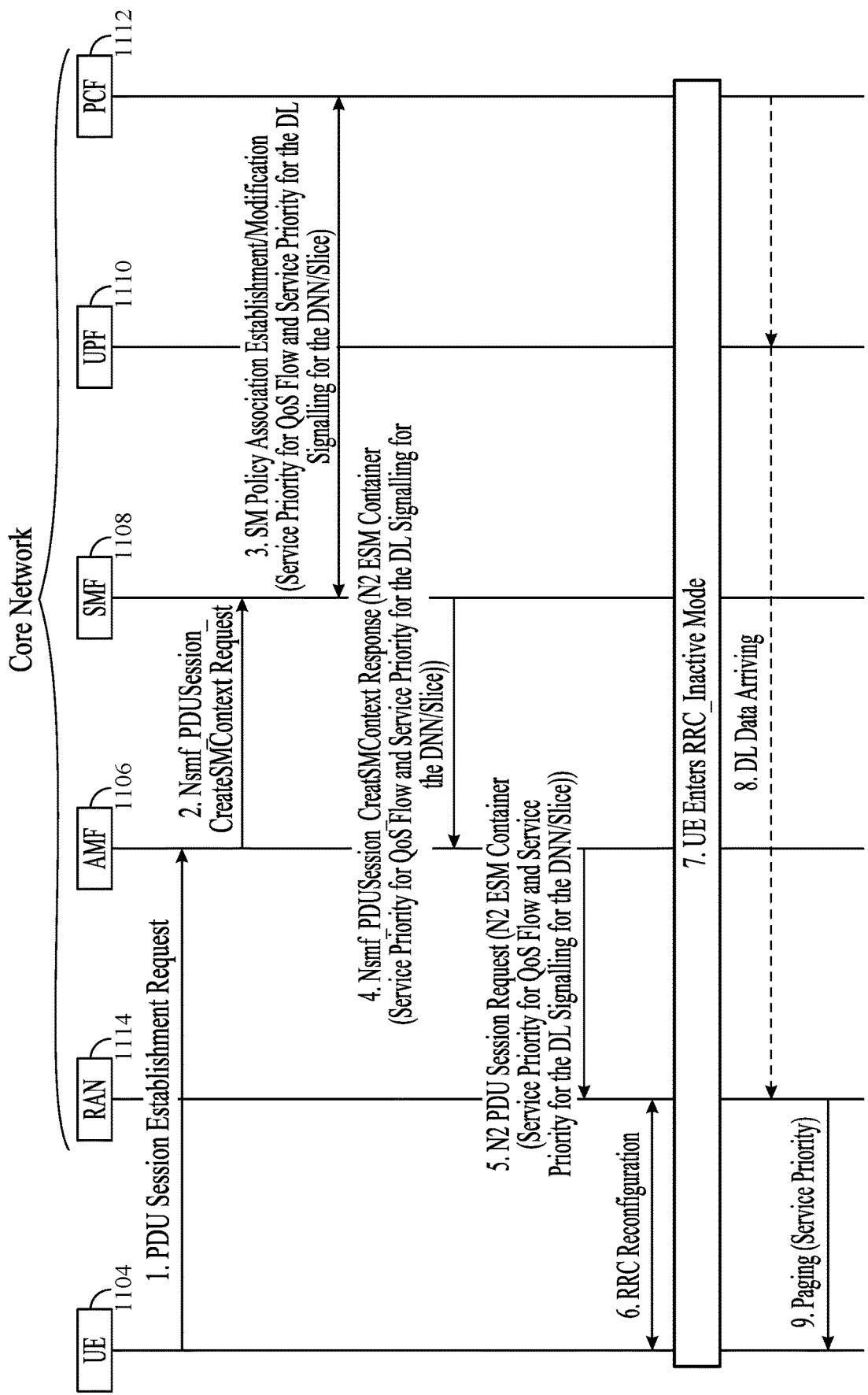
FIG. 11 is a call flow diagram illustrating an exemplary procedure for transmitting a paging message to the UE in an RRC inactive mode, in accordance with certain aspects of the present disclosure.

FIG. 11 illustrates an example call flow for transmitting a paging message to the UE in an RRC inactive mode, according to certain aspects presented here. As illustrated, steps 1-3 of FIG. 11 may be the same as steps 1-3 in FIG. 9 with the UE 1104 initiating a PDU session establishment/QoS establishment procedure in the second network and the SMF 1108 retrieving the service priority (e.g., the policy configuration information) from the PCF 1112.

At step 4 in FIG. 11, during the PDU Session Establishment procedure, the SMF 1108 may send an Nsmf_PDUSession_CreatSMContext response message to AMF 1106. The service priority with the QoS flow and DL signaling service priority information received from PCF 1112 may be included in an N2 SM Container of the Nsmf_PDUSession-_CreatSMContext response message.

At step 5, the AMF 1106 may forward the N2 SM Container to RAN 1114 (e.g., the second network). According to aspects, the RAN 1114 may store the service priority information received in N2 SM Container as the SM context of the UE 1104.

At step 6, the RAN 1114 establishes a data radio bearer (DRB) for the PDU session (e.g., in some cases as indicated in RRC reconfiguration information) according to a standard procedure. For example, if UE 1104 requests to establish a new PDU session, the SMF 1108 may request RAN 1114 to establish the DRB for this PDU session, which may be used to transmit data on a radio interface.

In some cases, a new QoS rule may be allocated for the PDU session in a PDU Session modification procedure. In this case, the service priority information for the new QoS flow may be sent from PCF 1112. The SMF 1108 may also include the service priority information for the new QoS in the N2 SM container in the N11 message sent to AMF 1106 who forwards the N2 SM container to the RAN 1114. As noted, the RAN 1114 may store the received service priority information as the SM context of the UE 1104.

At step 7, the UE 1114 may enter an RRC inactive mode.

According to aspects, when the UE 1114 enters the RRC inactive mode, if there is information that needs to be transmitted to the UE in the second network (e.g., downlink data), the UPF 1110 transfers the information to the RAN 1114 (e.g., the second network) at step 8. The RAN 1114 may then determine the service priority for the QoS flow associated with the information that needs to be transmitted to the UE 1104 according to the service priority information that stored as the SM context of the UE 1104. Thereafter, at step 9, the RAN 1114 sends a paging message to the UE 1104 with an indication of the service priority (e.g., service priority information) on Uu interface.

According to aspects, the UE 1104 may use the service priority information in the paging message to determine whether establish a connection with the RAN 1114 (e.g., to receive the information that needs to be transmitted) or whether to ignore the paging message altogether, for example, as described above. For example, as noted, if the paging message includes service priority information corresponding to high priority information, the UE 1104 may decide to respond to the paging message and receive the information from the RAN 1114; otherwise, the UE 1104 may decide to ignore the paging message and not receive the information.

Figure 12:
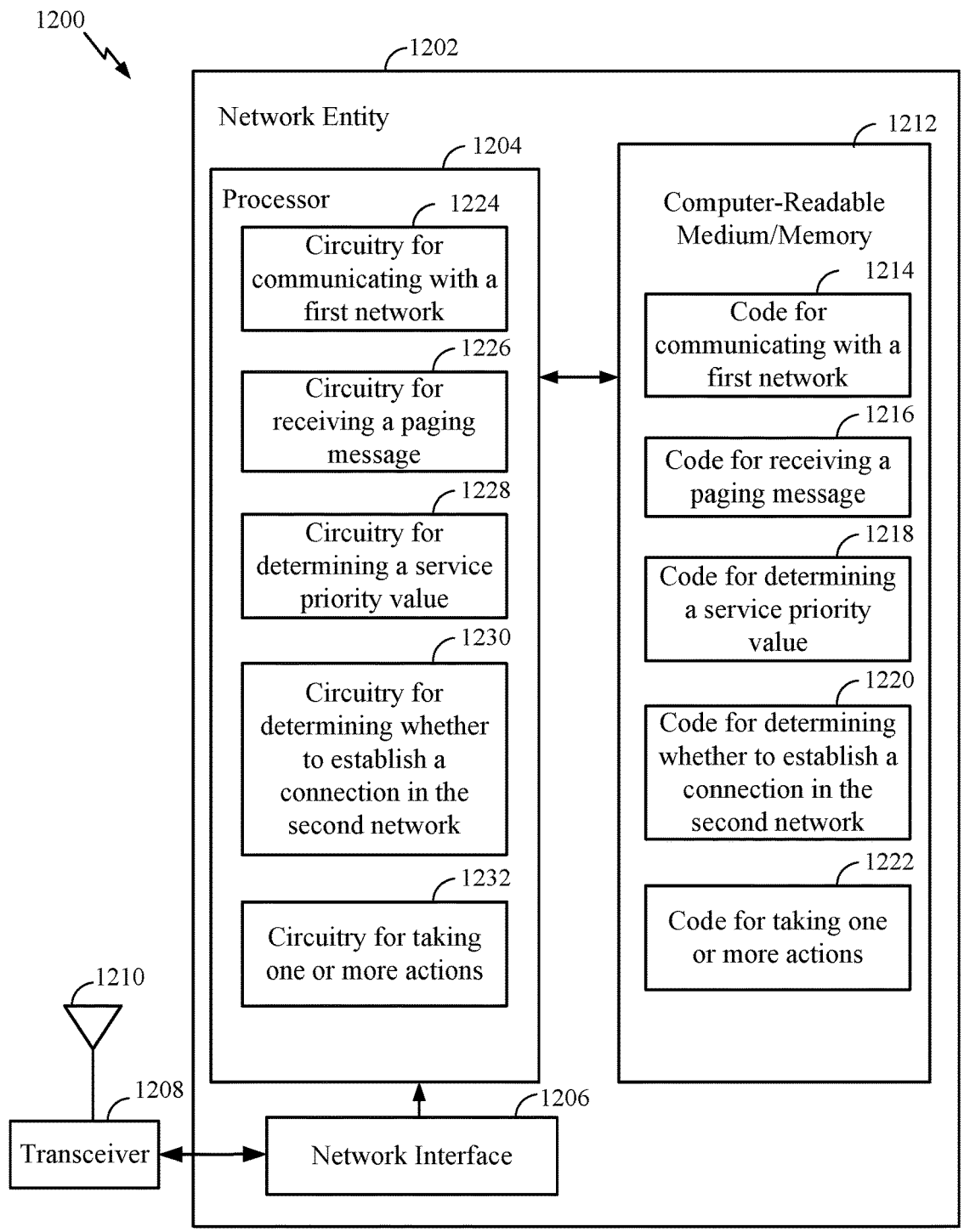
FIG. 12 illustrates an example communications device that may include various components configured to perform operations for the techniques disclosed herein in accordance with aspects of the present disclosure.

FIG. 12 illustrates example communications device 1200 that may include various components (e.g., corresponding to means-plus-function components) configured to perform operations for the techniques disclosed herein, such as the operations illustrated in FIGS. 4 and 8-11. In some examples, the communication device 1200 is a network entity such as a UE (e.g., UE 120). The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus. In certain aspects, the computer-readable medium/memory 1212 is configured to store instructions (e.g., computer-executable code) that when executed by the processor 1204, cause the processor 1204 to perform the operations illustrated in FIGS. 4 and 8-11, or other operations for performing the various techniques discussed herein for service priority information for multi-TRP UE paging. In certain aspects, computer-readable medium/memory 1212 stores code 1214 for communicating with a first network using a first set of credentials, wherein the UE includes a second set of credentials associated with a second network, in accordance with aspects of the present disclosure; code 1216 for receiving a paging message for an information transmission in the second network, wherein the paging message includes service priority information corresponding to the information transmission, in accordance with aspects of the present disclosure; code 1218 for determining, from the service priority information, a service priority value corresponding to the information transmission based, at least in part, on policy configuration information, in accordance with aspects of the present disclosure; code 1220 for determining whether to establish a connection in the second network in response to the paging message based, at least in part, on the service priority value in accordance with aspects of the present disclosure; and code 1222 for taking one or more actions based, at least in part, on the determination, in accordance with aspects of the present disclosure.

In certain aspects, the processor 1204 includes circuitry configured to implement the code stored in the computer-readable medium/memory 1212. For example, the processor 1204 includes circuitry for circuitry 1224 for communicating with a first network using a first set of credentials, wherein the UE includes a second set of credentials associated with a second network, in accordance with aspects of the present disclosure; circuitry 1226 for receiving a paging message for an information transmission in the second network, wherein the paging message includes service priority information corresponding to the information transmission, in accordance with aspects of the present disclosure; circuitry 1228 for determining, from the service priority information, a service priority value corresponding to the information transmission based, at least in part, on policy configuration information, in accordance with aspects of the present disclosure; circuitry 1230 for determining whether to establish a connection in the second network in response to the paging message based, at least in part, on the service priority value, in accordance with aspects of the present disclosure; and circuitry 1232 for taking one or more actions based, at least in part, on the determination, in accordance with aspects of the present disclosure.

The processor 1204 is coupled with network interface 1206. The network interface 1206 is configured to communicate with a wireless network. For example, the network interface 1206 is configured to receive a paging message for an information transmission in the second network, wherein the paging message includes service priority information corresponding to the information transmission. The network interface 1206 may be wired and/or wireless and communicate with the wireless network via the transceiver 1208 and antenna 1210 or via a hardwired connection.

Figure 13:
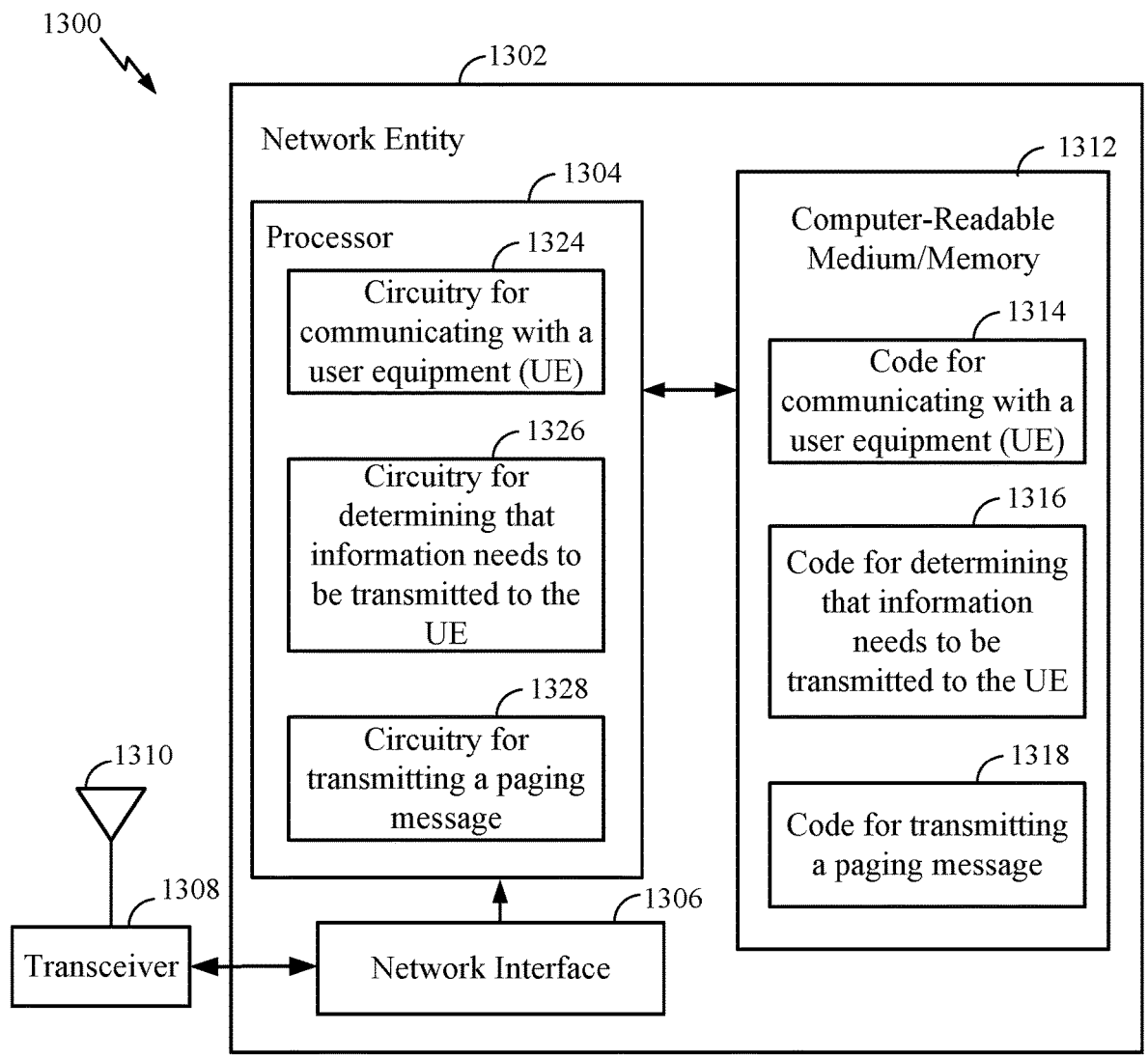
FIG. 13 illustrates an example communications device that may include various components configured to perform operations for the techniques disclosed herein in accordance with aspects of the present disclosure.

FIG. 13 illustrates example communications device 1300 that may include various components (e.g., corresponding to means-plus-function components) configured to perform operations for the techniques disclosed herein, such as the operations illustrated in FIGS. 5 and 8-11. In some examples, the communication device 1300 is a core network entity or a RAN entity (such as a BS). The communications device 1300 includes a processing system 1302 coupled to a transceiver 1308. The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus. In certain aspects, the computer-readable medium/memory 1312 is configured to store instructions (e.g., computer-executable code) that when executed by the processor 1304, cause the processor 1304 to perform the operations illustrated in FIGS. 5 and 8-11, or other operations for performing the various techniques discussed herein for service priority information for multi-TRP UE paging. In certain aspects, computer-readable medium/memory 1312 stores code 1314 for communicating with a user equipment (UE), in accordance with aspects of the present disclosure; code 1316 for determining that information needs to be transmitted to the UE, in accordance with aspects of the present disclosure; and code 1318 for transmitting a paging message to the UE indicating that the information needs to be transmitted to the UE, wherein the paging message includes service priority information corresponding to the information that needs to be transmitted to the UE, in accordance with aspects of the present disclosure.

In certain aspects, the processor 1304 includes circuitry configured to implement the code stored in the computer-readable medium/memory 1312. For example, the processor 1304 includes circuitry 1324 for communicating with a user equipment (UE), in accordance with aspects of the present disclosure; circuitry 1326 for determining that information needs to be transmitted to the UE, in accordance with aspects of the present disclosure; and circuitry 1328 for transmitting a paging message to the UE indicating that the information needs to be transmitted to the UE, wherein the paging message includes service priority information corresponding to the information that needs to be transmitted to the UE, in accordance with aspects of the present disclosure.

The processor 1304 is coupled with network interface 1306. The network interface 1306 is configured to communicate with a user equipment (UE) and to transmit a paging message to the UE. For example, the network interface 1306 is configured to receive a paging message for an information transmission in the second network, wherein the paging message includes service priority information corresponding to the information transmission. The network interface 1306 may be wired and/or wireless and communicate with the wireless network via the transceiver 1308 and antenna 1310 or via a hardwired connection.

Figure 14:
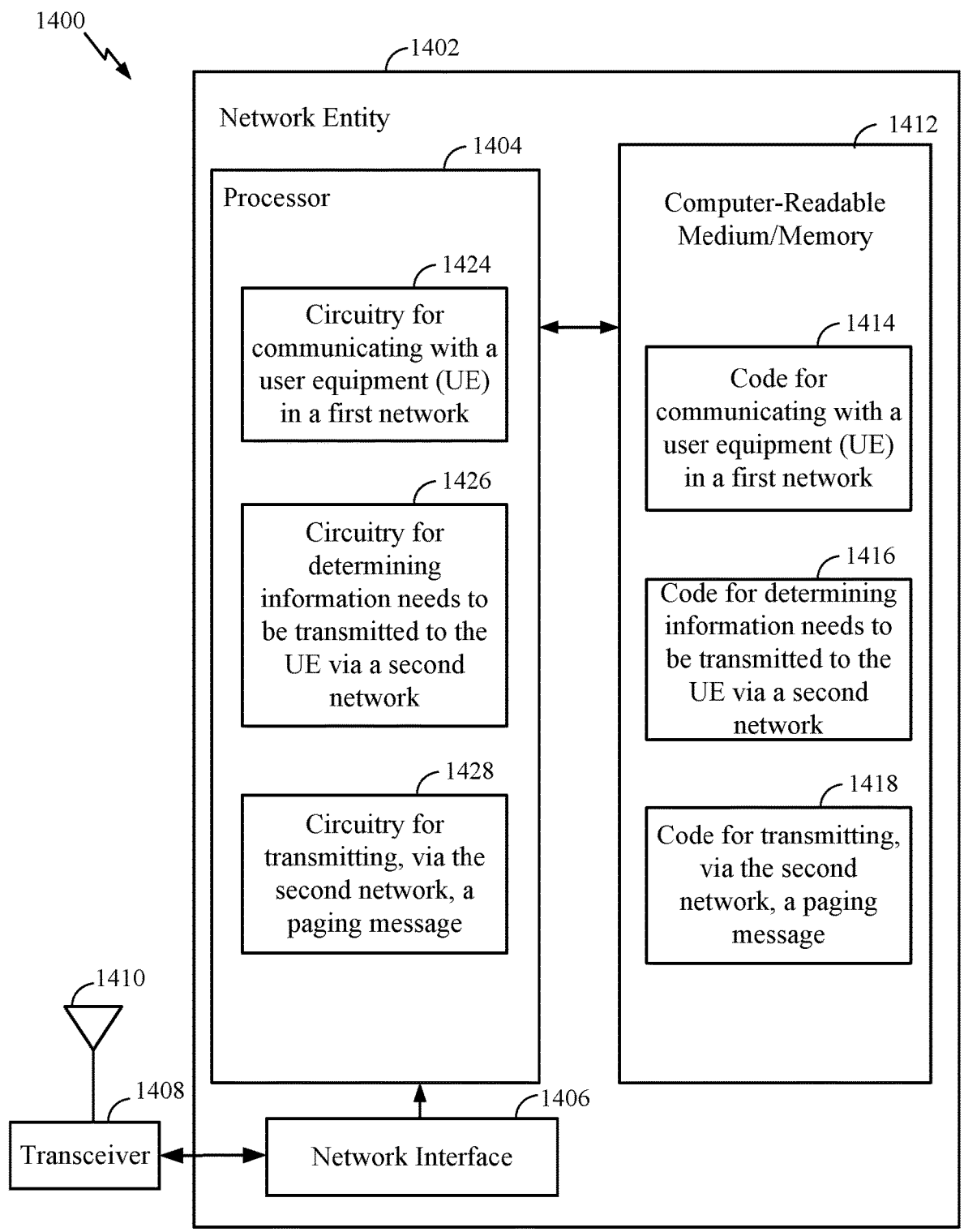
FIG. 14 illustrates an example communications device that may include various components configured to perform operations for the techniques disclosed herein in accordance with aspects of the present disclosure.

FIG. 14 illustrates example communications device 1400 that may include various components (e.g., corresponding to means-plus-function components) configured to perform operations for the techniques disclosed herein, such as the operations illustrated in FIGS. 6 and 8-11. In some examples, the communication device 1400 is a core network entity or a RAN entity (such as a BS). The communications device 1400 includes a processing system 1402 coupled to a transceiver 1408. The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus. In certain aspects, the computer-readable medium/memory 1412 is configured to store instructions (e.g., computer-executable code) that when executed by the processor 1404, cause the processor 1404 to perform the operations illustrated in FIGS. 6 and 8-11, or other operations for performing the various techniques discussed herein for service priority information for multi-TRP UE paging. In certain aspects, computer-readable medium/memory 1412 stores code 1414 for communicating with a user equipment (UE) in a first network using a first set of UE credentials, in accordance with aspects of the present disclosure; code 1416 for determining information needs to be transmitted to the UE via a second network using a second set of UE credentials, in accordance with aspects of the present disclosure; and code 1418 for transmitting, via the second network, a paging message indicating the information needs to be transmitted to the UE via the second network, wherein the paging message includes service priority information corresponding to the information that needs to be transmitted to the UE, in accordance with aspects of the present disclosure.

In certain aspects, the processor 1404 includes circuitry configured to implement the code stored in the computer-readable medium/memory 1412. For example, the processor 1404 includes circuitry 1424 for communicating with a user equipment (UE) in a first network using a first set of UE credentials, in accordance with aspects of the present disclosure; circuitry 1426 for determining information needs to be transmitted to the UE via a second network using a second set of UE credentials, in accordance with aspects of the present disclosure; and circuitry 1428 for transmitting a paging message to the UE indicating that the information needs to be transmitted to the UE, wherein the paging message includes service priority information corresponding to the information that needs to be transmitted to the UE, in accordance with aspects of the present disclosure.

The processor 1404 is coupled with network interface 1406. The network interface 1406 is configured to communicate with a user equipment (UE) in a first network using a first set of UE credentials and to transmit a paging message to the UE. For example, the network interface 1406 is configured to receive a paging message for an information transmission in the second network, wherein the paging message includes service priority information corresponding to the information transmission. The network interface 1406 may be wired and/or wireless and communicate with the wireless network via the transceiver 1408 and antenna 1410 or via a hardwired connection.

Figure 15:
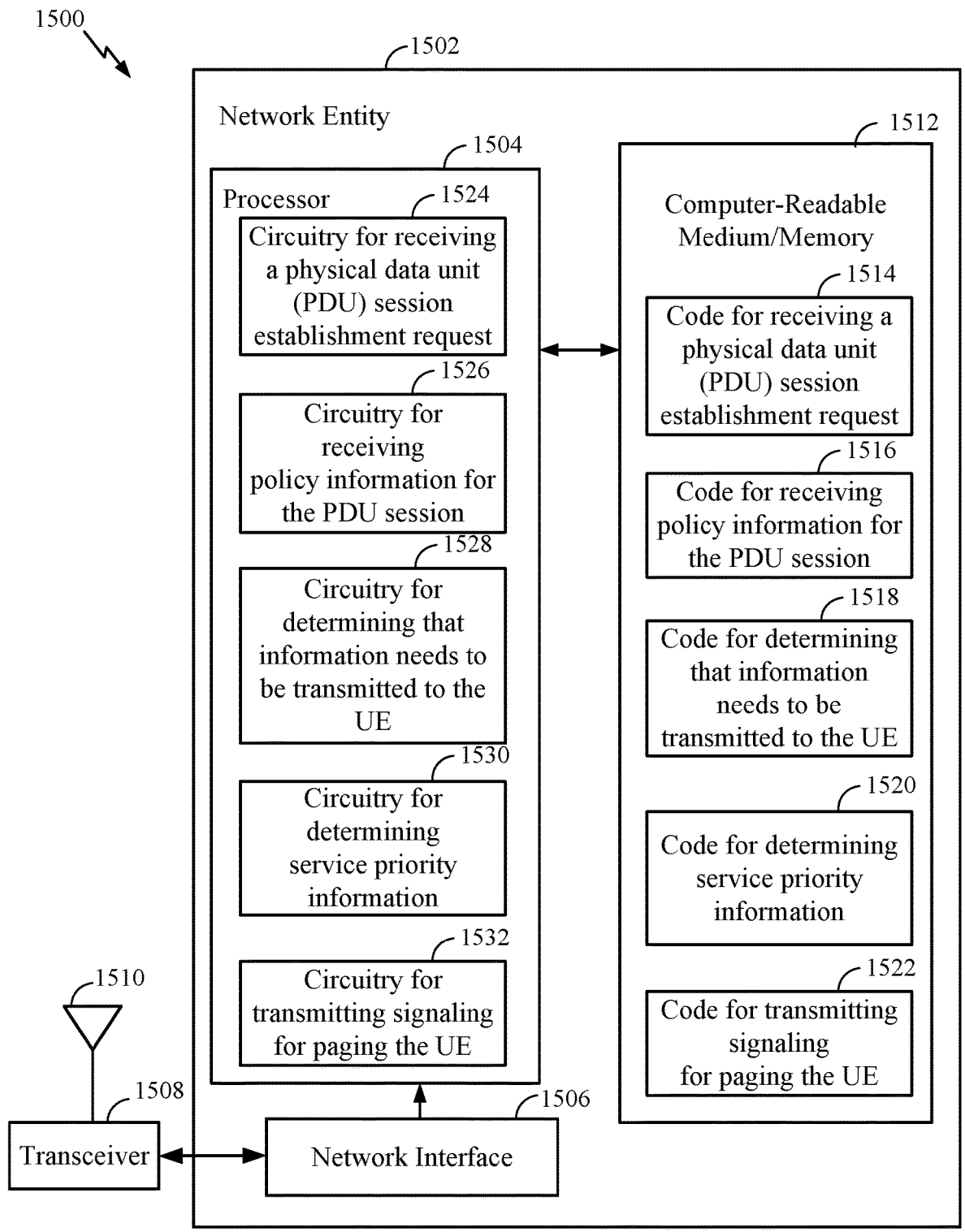
FIG. 15 illustrates an example communications device that may include various components configured to perform operations for the techniques disclosed herein in accordance with aspects of the present disclosure.

FIG. 15 illustrates example communications device 1500 that may include various components (e.g., corresponding to means-plus-function components) configured to perform operations for the techniques disclosed herein, such as the operations illustrated in FIGS. 7 and 8-11. In some examples, the communication device 1500 is a core network entity or a RAN entity (such as a SMF). The communications device 1500 includes a processing system 1502 coupled to a transceiver 1508. The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus. In certain aspects, the computer-readable medium/memory 1512 is configured to store instructions (e.g., computer-executable code) that when executed by the processor 1504, cause the processor 1504 to perform the operations illustrated in FIGS. 7 and 8-11, or other operations for performing the various techniques discussed herein for service priority information for multi-TRP UE paging. In certain aspects, computer-readable medium/memory 1512 stores code 1514 for receiving a physical data unit (PDU) session establishment request for a user equipment (UE), in accordance with aspects of the present disclosure; code 1516 for receiving, from a second network entity, policy configuration information for the PDU session, wherein the policy configuration information includes service priority information associated with the PDU session, in accordance with aspects of the present disclosure; code 1518 for determining that information needs to be transmitted to the UE, in accordance with aspects of the present disclosure; code 1520 for determining, based on the policy configuration information, service priority information corresponding to the information that needs to be transmitted to the UE, in accordance with aspects of the present disclosure; and code 1522 for transmitting signaling to a third network entity for paging the UE about the information that needs to be transmitted to the UE, wherein the signaling includes an indication of the service priority information corresponding to the information that needs to be transmitted to the UE, in accordance with aspects of the present disclosure.

In certain aspects, the processor 1504 includes circuitry configured to implement the code stored in the computer-readable medium/memory 1512. For example, the processor 1504 includes circuitry for circuitry 1524 for receiving a physical data unit (PDU) session establishment request for a user equipment (UE), in accordance with aspects of the present disclosure; circuitry 1526 for receiving, from a second network entity, policy configuration information for the PDU session, wherein the policy configuration information includes service priority information associated with the PDU session, in accordance with aspects of the present disclosure; circuitry 1528 for determining that information needs to be transmitted to the UE, in accordance with aspects of the present disclosure; circuitry 1530 for determining, based on the policy configuration information, service priority information corresponding to the information that needs to be transmitted to the UE, in accordance with aspects of the present disclosure; and circuitry 1532 for transmitting signaling to a third network entity for paging the UE about the information that needs to be transmitted to the UE, wherein the signaling includes an indication of the service priority information corresponding to the information that needs to be transmitted to the UE, on the determination, in accordance with aspects of the present disclosure.

The processor 1504 is coupled with network interface 1506. The network interface 1506 is configured to communicate with a wireless network. For example, the network interface 1506 is configured receive a physical data unit (PDU) session establishment request, receive policy configuration information for the PDU session, and transmit signaling for paging the UE. The network interface 1506 may be wired and/or wireless and communicate with the wireless network via the transceiver 1508 and antenna 1510 or via a hardwired connection.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHS layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module.

Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 4-11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), comprising:
communicating with a first network using a first set of credentials, wherein the UE includes a second set of credentials associated with a second network;

receiving system information (SI), in a radio resource control (RRC) message, that indicates how to interpret service priority information to determine a service priority value;

receiving a paging message for an information transmission in the second network, wherein the paging message includes the service priority information corresponding to the information transmission, wherein the service priority information indicates a range of different service priority values corresponding to the information transmission;

determining, from the service priority information, the service priority value corresponding to the information transmission based, at least in part, on the SI that indicates how to interpret the service priority information;

determining whether to establish a connection in the second network in response to the paging message based, at least in part, on the service priority value; and taking one or more actions based, at least in part, on the determination.

2. The method of claim 1, wherein determining whether to establish the connection in the second network comprises determining not to establish the connection in the second network.

3. The method of claim 2, wherein taking one or more actions comprises ignoring the paging message and continuing to communicate with the first network.

4. The method of claim 1, wherein determining whether to establish the connection in the second network comprises determining to establish the connection in the second network.

5. The method of claim 4, wherein taking one or more actions comprises:
establishing the connection in the second network; and
receiving the information transmission in the second network.

6. The method of claim 1, wherein:
the service priority value indicates that the information transmission includes low priority information; and
taking the one or more actions comprises ignoring the paging message.

7. The method of claim 1, wherein:
the service priority value indicates that the information transmission includes high-priority information; and
taking the one or more actions comprises receiving the information transmission in the second network.

8. The method of claim 1, wherein the UE is not capable of simultaneous communication with both the first network and the second network.

9. The method of claim 1, wherein the first set of credentials are stored in a first universal subscriber identity module (USIM).

10. The method of claim 9, wherein the second set of credentials are stored in one of:
the first USIM; or
a second USIM.

11. A method for wireless communication by a network entity, comprising:
communicating with a user equipment (UE);
transmitting system information (SI), in a radio resource control (RRC) message, that indicates how to interpret service priority information to determine a service priority value associated with information that needs to be transmitted to the UE;
determining the information needs to be transmitted to the UE; and
transmitting a paging message to the UE indicating that the information needs to be transmitted to the UE, wherein the paging message includes the service priority information corresponding to the information that needs to be transmitted to the UE, wherein the service priority information indicates a range of different service priority values corresponding to the information transmission.

12. A method for wireless communication by a network entity, comprising:
communicating with a user equipment (UE) in a first network using a first set of UE credentials;
transmitting system information (SI), in a radio resource control (RRC) message, that indicates how to interpret service priority information to determine a service priority value associated with information that needs to be transmitted to the UE;
determining the information needs to be transmitted to the UE via a second network using a second set of UE credentials; and
transmitting, via the second network, a paging message indicating the information needs to be transmitted to the UE via the second network, wherein the paging message includes the service priority information corresponding to the information that needs to be transmitted to the UE, wherein the service priority information indicates a range of different service priority values corresponding to the information transmission.

13. An apparatus for wireless communication by a user equipment (UE), comprising:
one or more processors configured to execute instructions stored on one or more memories and to cause the UE to:
communicate with a first network using a first set of credentials, wherein the UE includes a second set of credentials associated with a second network;
receive system information (SI), in a radio resource control (RRC) message, that indicates ow to interpret service priority information to determine a service priority value;
receive a paging message for an information transmission in the second network, wherein the paging message includes the service priority information corresponding to the information transmission, wherein the service priority information indicates a range of different service priority values corresponding to the information transmission;
determine, from the service priority information, the service priority value corresponding to the information transmission based, at least in part, on the SI that indicates how to interpret the service priority information;
determine whether to establish a connection in the second network in response to the paging message based, at least in part, on the service priority value; and
take one or more actions based, at least in part, on the determination.

14. An apparatus for wireless communication by a user equipment (UE), comprising:
means for communicating with a first network using a first set of credentials, wherein the UE includes a second set of credentials associated with a second network;
means for receiving system information (SI), in a radio resource control (RRC) message, that indicates how to interpret service priority information to determine a service priority value;

means for receiving a paging message for an information transmission in the second network, wherein the paging message includes the service priority information corresponding to the information transmission, wherein the service priority information indicates a range of different service priority values corresponding to the information transmission;

means for determining, from the service priority information, the service priority value corresponding to the information transmission based, at least in part, on theSI that indicates how to interpret the service priority information;

means for determining whether to establish a connection in the second network in response to the paging message based, at least in part, on the service priority value; and means for taking one or more actions based, at least in part, on the determination.

15. A non-transitory computer-readable medium for wireless communication by a user equipment (UE), comprising:
instructions that, when executed by one or more processors of the UE, cause the UE to:
communicate with a first network using a first set of credentials, wherein the UE includes a second set of credentials associated with a second network;
receive system information (SI), in a radio resource control (RRC) message, that indicates ow to interpret service priority information to determine a service priority value;
receive a paging message for an information transmission in the second network, wherein the paging message includes the service priority information corresponding to the information transmission, wherein the service priority information indicates a range of different service priority values corresponding to the information transmission;
determine, from the service priority information, the service priority value corresponding to the information transmission based, at least in part, on the SI that indicates how to interpret the service priority information;
determine whether to establish a connection in the second network in response to the paging message based, at least in part, on the service priority value; and
take one or more actions based, at least in part, on the determination.

16. An apparatus for wireless communication by a network entity, comprising:
one or more processors configured to execute instructions stored on one or more memories and to cause the network entity to:
communicate with a user equipment (UE);
transmit system information (SI), in a radio resource control (RRC) message, that indicates how to interpret service priority information to determine a service priority value associated with information that needs to be transmitted to the UE;
receive a protocol data unit (PDU) session establishment request for communicating in a second network using a second set of credentials;
transmit, in response to the PDU session establishment request, a PDU session establishment response including policy configuration information, wherein the policy configuration information comprises at least one of a service priority for a QoS flow requested in the PDU session establishment request or a service priority for downlink signaling for a data network name or slice requested in the PDU session establishment request;
determine the information needs to be transmitted to the UE; and
transmit a paging message to the UE indicating that the information needs to be transmitted to the UE, wherein the paging message includes the service priority information corresponding to the information that needs to be transmitted to the UE, wherein the service priority information indicates a range of different service priority values corresponding to the information transmission.

17. An apparatus for wireless communication by a network entity, comprising:
means for communicating with a user equipment (UE);
means for transmitting system information (SI), in a radio resource control (RRC) message, that indicates how to interpret service priority information to determine a service priority value associated with information that needs to be transmitted to the UE;
means for receiving a protocol data unit (PDU) session establishment request for communicating in a second network using a second set of credentials;
means for transmitting, in response to the PDU session establishment request, a PDU session establishment response including policy configuration information, wherein the policy configuration information comprises at least one of a service priority for a QoS flow requested in the PDU session establishment request or a service priority for downlink signaling for a data network name or slice requested in the PDU session establishment request;
means for determining that the information needs to be transmitted to the UE; and
means for transmitting a paging message to the UE indicating that the information needs to be transmitted to the UE, wherein the paging message includes the service priority information corresponding to the information that needs to be transmitted to the UE, wherein the service priority information indicates a range of different service priority values corresponding to the information transmission.

18. A non-transitory computer-readable medium for wireless communication by a network entity, comprising:
instructions that, when executed by one or more processors, cause the network entity to:
communicate with a user equipment (UE);
transmit system information (SI), in a radio resource control (RRC) message, that indicates ow to interpret service priority information to determine a service priority value associated with information that needs to be transmitted to the UE;
determine the information needs to be transmitted to the UE; and
transmit a paging message to the UE indicating that the information needs to be transmitted to the UE, wherein the paging message includes service priority information corresponding to the information that needs to be transmitted to the UE, wherein the service priority information indicates a range of different service priority values corresponding to the information transmission.

19. An apparatus for wireless communication by a network entity, comprising:

one or more processors configured to execute instructions stored on one or more memories and to cause the network entity to:
- communicate with a user equipment (UE) in a first network using a first set of UE credentials;
- transmit system information (SI), in a radio resource control (RRC) message, that indicates ow to interpret service priority information to determine a service priority value;
- determine information needs to be transmitted to the UE via a second network using a second set of UE credentials; and
- transmit, via the second network, a paging message indicating the information needs to be transmitted to the UE via the second network, wherein the paging message includes the service priority information corresponding to the information that needs to be transmitted to the UE, wherein the service priority information indicates a range of different service priority values corresponding to the information transmission.

20. An apparatus for wireless communication by a network entity, comprising:
- means for communicating with a user equipment (UE) in a first network using a first set of UE credentials;
- means for transmitting system information (SI), in a radio resource control (RRC) message, that indicates how to interpret service priority information to determine a service priority value;
- means for determining information needs to be transmitted to the UE via a second network using a second set of UE credentials; and
- means for transmitting, via the second network, a paging message indicating the information needs to be transmitted to the UE via the second network, wherein the paging message includes the service priority information corresponding to the information that needs to be transmitted to the UE, wherein the service priority information indicates a range of different service priority values corresponding to the information transmission.

21. A non-transitory computer-readable medium for wireless communication by a network entity, comprising:
- instructions that, when executed by one or more processors, cause the network entity to:
  - communicate with a user equipment (UE) in a first network using a first set of UE credentials;
  - transmit system information (SI), in a radio resource control (RRC) message, that indicates ow to interpret service priority information to determine a service priority value;
  - determine information needs to be transmitted to the UE via a second network using a second set of UE credentials; and
  - transmit, via the second network, a paging message indicating the information needs to be transmitted to the UE via the second network, wherein the paging message includes the service priority information corresponding to the information that needs to be transmitted to the UE, wherein the service priority information indicates a range of different service priority values corresponding to the information transmission.

* * * * *